United States Patent
Dixon et al.

(10) Patent No.: US 11,429,670 B2
(45) Date of Patent: Aug. 30, 2022

(54) GEOLOGIC FORMATION OPERATIONS FRAMEWORK CONTROL

(71) Applicant: Schlumberger Technology Corporation, Sugar Land, TX (US)

(72) Inventors: Todd Christopher Dixon, Pune (IN); Michael Antony Cleminson, Pune (IN)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/947,022

(22) Filed: Jul. 15, 2020

(65) Prior Publication Data

US 2021/0019350 A1 Jan. 21, 2021

(30) Foreign Application Priority Data

Jul. 16, 2019 (IN) .............................. 201921028673

(51) Int. Cl.
| | |
|---|---|
| G06F 16/903 | (2019.01) |
| E21B 49/00 | (2006.01) |
| G06F 3/0484 | (2022.01) |
| G06F 16/58 | (2019.01) |
| G06F 16/587 | (2019.01) |
| G06F 16/245 | (2019.01) |
| G01V 3/38 | (2006.01) |

(52) U.S. Cl.
CPC ........ *G06F 16/90335* (2019.01); *E21B 49/00* (2013.01); *G01V 3/38* (2013.01); *G06F 3/0484* (2013.01); *G06F 16/245* (2019.01); *G06F 16/587* (2019.01); *G06F 16/5866* (2019.01); *E21B 2200/20* (2020.05); *G01V 2210/1216* (2013.01)

(58) Field of Classification Search
CPC ............. G06F 16/90335; G06F 16/245; G06F 16/5866; G06F 16/587; G06F 3/0484; G01V 3/38; G01V 2210/1216; E21B 49/00
See application file for complete search history.

(56) References Cited

U.S. PATENT DOCUMENTS

| | | | |
|---|---|---|---|
| 6,195,092 B1* | 2/2001 | Dhond ................... | G06Q 10/10 702/6 |
| 6,751,555 B2* | 6/2004 | Poedjono ................ | G01V 1/34 702/6 |
| 2005/0119911 A1* | 6/2005 | Ayan ..................... | G01V 11/00 703/10 |
| 2018/0032747 A1* | 2/2018 | Whelan ............... | G06F 16/2282 |
| 2018/0114158 A1* | 4/2018 | Foubert ............... | G06Q 10/109 |
| 2021/0026030 A1* | 1/2021 | Dixon .................. | G01V 1/50 |

* cited by examiner

*Primary Examiner* — Mischita L Henson
(74) *Attorney, Agent, or Firm* — Jaime Castano

(57) ABSTRACT

A method can include accessing data generated during field operations; analyzing at least a portion of the data as to legal tag property values; storing the legal tag property values in association with the data; and operating a computational framework in accordance with the legal tag property values.

20 Claims, 14 Drawing Sheets

GEOLOGIC FORMATION OPERATIONS FRAMEWORK CONTROL

This application claims the benefit of India Patent Application No. 201921028673 filed on Jul. 16, 2019, and is hereby incorporated by reference in its entirety.

BACKGROUND

Various field operations can be performed with respect to a geologic formation. Such operations can include exploration operations, development operations, production operations, etc., with respect to a reservoir in the geologic formation.

As an example, an operation can be a seismic survey that utilizes equipment to acquire a seismic data set as measured and recorded with reference to a particular area of the Earth, for example, to evaluate a subsurface formation. A seismic survey can be acquired using one or more of surface, ocean/sea bottom, marine, borehole, land or other technology. A seismic survey can acquire a seismic data set or sets, which can be spatial (e.g., 1D, 2D or 3D) or spatial and temporal (e.g., 1D, 2D or 3D in space and 1D in time). Seismic data can be visualized by processing and rendering to a display where an interpreter can identify and select boundaries that can are representative of structure(s) in the Earth (e.g. reflectors, etc.).

As an example, an "Earth model" may be constructed using interpreted seismic data and optionally one or more other types of data. For example, consider constructing an Earth model that represents a reservoir using seismic data and exploratory borehole data and performing a simulation of physical phenomena (e.g., fluid flow, etc.) using a reservoir simulator. Results of a simulator can indicate a possible target that may be reached by drilling a borehole into the formation where the borehole can be completed to form a well that can produce fluid from the reservoir.

As an example, an operation can be a drilling operation where a borehole can be drilled into a geologic formation where the bore may be utilized to form a well. As an example, an operation can be a logging operation, which may be a wireline logging operation, a logging while drilling operation or another type of logging operation. After a borehole is formed by drilling, a formation is exposed via the borehole, which provides an opportunity to utilize one or more logging tools to acquire measurements (e.g., via sensors) that can be processed to determine properties of the formation (e.g., rock properties, fluid properties, etc.). As an example, logging may be performed before, during or after casing, cementing, fracturing, treating, etc. As an example, a cased-hole logging tool may include equipment to measure fluid flow rates and/or one or more other production parameters in a wellbore or, for example, to examine integrity of a casing and/or cement.

A rig can be a system of components that can be operated to form a borehole in a geologic formation, to transport equipment into and out of a bore in a geologic formation, etc. As an example, a rig may include a system that can be used to drill a bore and to acquire information about a geologic formation, drilling, etc. As an example, a rig configured for drilling can include one or more of the following components and/or equipment: a mud tank, a mud pump, a derrick or a mast, drawworks, a rotary table or a top drive, a drillstring, power generation equipment and auxiliary equipment. As an example, an offshore rig may include one or more of such components, which may be on a vessel or a drilling platform. As an example, a rotary steerable system (RSS) can be utilized to drill directionally. An RSS can include a bottom hole assembly (BHA) that includes features that provide for directional drilling. As an example, a rig or other surface equipment (e.g., onshore or offshore) may be utilized to perform one or more other types of operations, which can include logging operations.

SUMMARY

A method can include accessing data generated during field operations; analyzing at least a portion of the data as to legal tag property values; storing the legal tag property values in association with the data; and operating a computational framework in accordance with the legal tag property values. A system can include a processor; memory accessible to the processor; processor-executable instructions stored in the memory and executable by the processor to instruct the system to: access data generated during field operations; analyze at least a portion of the data as to legal tag property values; store the legal tag property values in association with the data; and operate a computational framework in accordance with the legal tag property values. One or more computer-readable storage media can include computer-executable instructions executable to instruct a computing system to: access data generated during field operations; analyze at least a portion of the data as to legal tag property values; store the legal tag property values in association with the data; and operate a computational framework in accordance with the legal tag property values. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
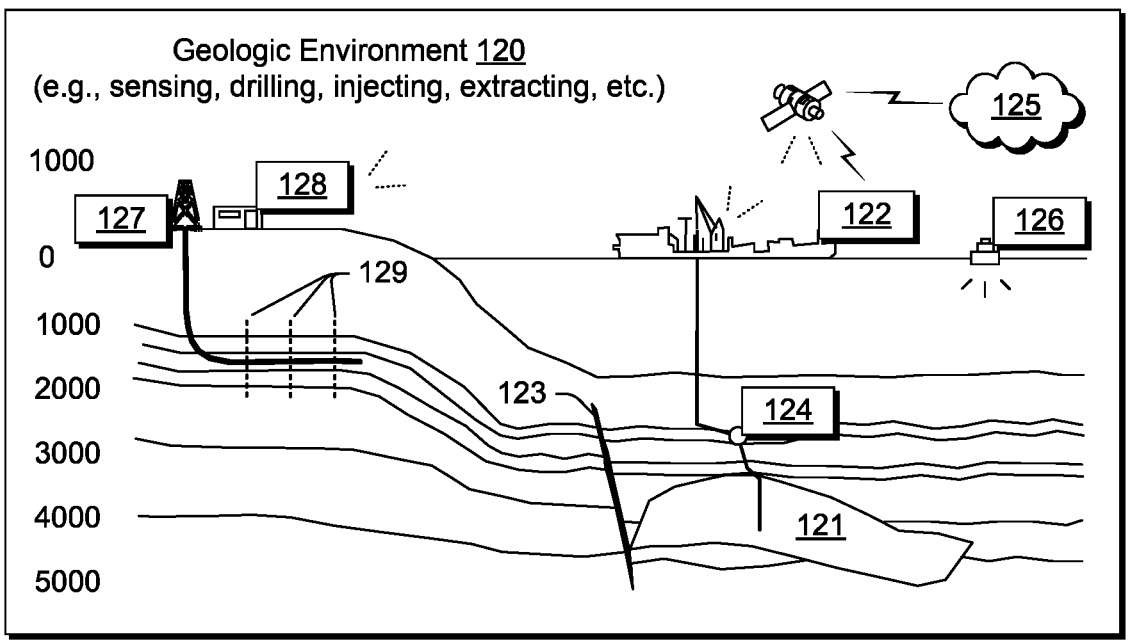
FIG. 1 illustrates examples of equipment in a geologic environment.
Figure 1:
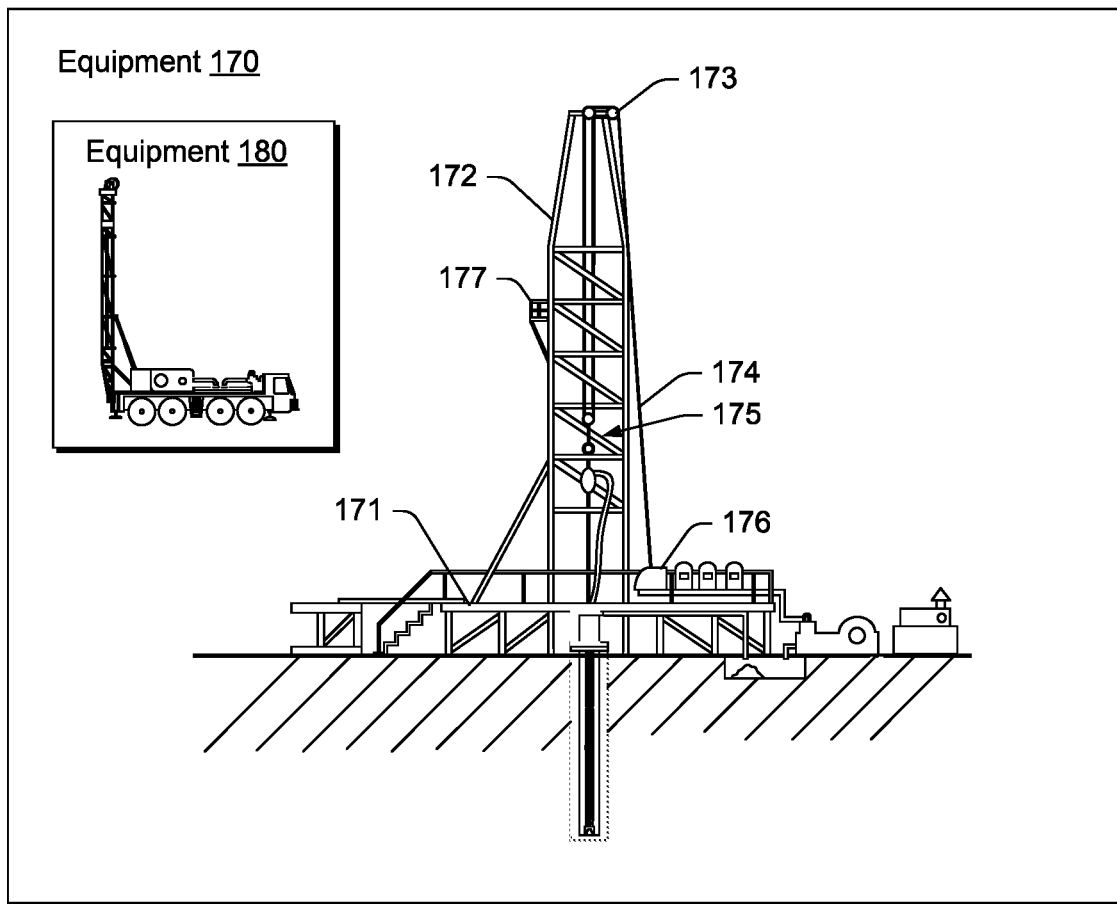

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

Various operations can be performed in a field. For example, consider exploration as an initial phase in petroleum operations that includes generation of a prospect or play or both, and drilling of an exploration well or borehole. Appraisal, development and production phases may follow successful exploration.

A borehole may be referred to as a wellbore and can include an openhole portion or an uncased portion and/or may include a cased portion. A borehole may be defined by a bore wall that is composed of a rock that bounds the borehole.

As to a well or borehole, whether for one or more of exploration, sensing, production, injection or other operation(s), it can be planned. Such a process may be referred to generally as well planning, a process by which a path can be mapped in a geologic environment. Such a path may be referred to as a trajectory, which can include coordinates in a three-dimensional coordinate system where a measure along the trajectory may be a measured depth, a total vertical depth or another type of measure. During drilling, wireline investigations, etc., equipment may be moved into and/or out of a well or borehole. Such operations can occur over time and may differ with respect to time. A planning process may call for performing various operations, which may be serial, parallel, serial and parallel, etc.

As an example, a well plan can be generated based at least in part on imposed constraints and known information. As an example, a well plan may be provided to a well owner, approved, and then implemented by a drilling service provider (e.g., a directional driller or "DD"). In such an example, a rig may be used to drill, for example, according to a well plan. During a period of time during which a well plan is implemented, a rig may transition from one state to another state, which may be referred to as rigstates. As an example, a state may be a drilling state or may be a state where drilling into a formation (e.g., rock) is not occurring (e.g., an idle state, a tripping-in state, a tripping-out state, etc.).

As an example, a well design system can account for one or more capabilities of a drilling system or drilling systems that may be utilized at a wellsite. As an example, a drilling engineer may be called upon to take such capabilities into account, for example, as one or more of various designs and specifications are created. As an example, a state such as a rigstate may correspond to a capability, for example, while the capability is being utilized.

As an example, a well design system, which may be a well planning system, may take into account automation. For example, where a wellsite includes wellsite equipment that can be automated, for example, via a local and/or a remote automation command, a well plan may be generated in digital form that can be utilized in a well drilling system where at least some amount of automation is possible and desired. For example, a digital well plan can be accessible by a well drilling system where information in the digital well plan can be utilized via one or more automation mechanisms of the well drilling system to automate one or more operations at a wellsite.

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with a variety of sensors, detectors, actuators, etc. For example, equipment 122 may include communication circuitry to receive and/or to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system. As shown in FIG. 1, the equipment 180 can be mobile as carried by a vehicle; noting that the equipment 170 can be assembled, disassembled, transported and re-assembled, etc.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrick person may be a rig crew member that works on a platform attached to a derrick or a mast. A derrick can include a landing on which a derrick person may stand. As an example, such a landing may be about 10 meters or more above a rig floor. In an operation referred to as trip out of the hole (TOH), a derrick person may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrick person controls the machinery rather than physically handling the pipe.

As an example, a trip may refer to the act of pulling equipment from a bore and/or placing equipment in a bore. As an example, equipment may include a drillstring that can be pulled out of the hole and/or place or replaced in the hole. As an example, a pipe trip may be performed where a drill bit has dulled or has otherwise ceased to drill efficiently and is to be replaced.

Figure 2:
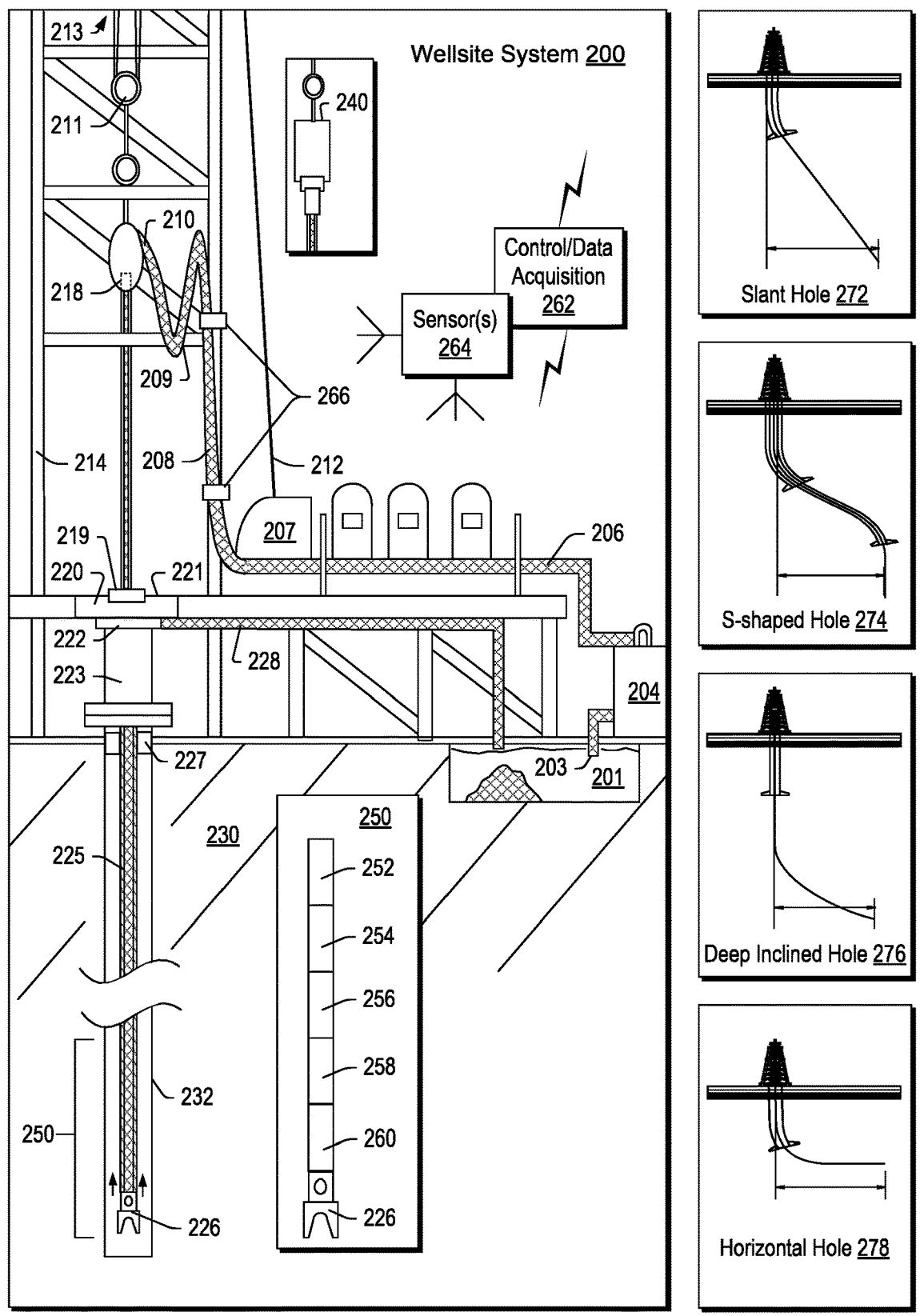
FIG. 2 illustrates an example of a system and examples of types of holes.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventers (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the platform 215 and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drill string 225 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drill string 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measurement-while-drilling (MWD) module 256, an optional module 258, a rotary-steerable system (RSS) and/or motor 260, and the drill bit 226. Such components or modules may be referred to as tools where a drillstring can include a plurality of tools.

As to a RSS, it involves technology utilized for direction drilling. Directional drilling involves drilling into the Earth to form a deviated bore such that the trajectory of the bore is not vertical; rather, the trajectory deviates from vertical along one or more portions of the bore. As an example, consider a target that is located at a lateral distance from a surface location where a rig may be stationed. In such an example, drilling can commence with a vertical portion and then deviate from vertical such that the bore is aimed at the target and, eventually, reaches the target. Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor; however, a mud motor can present some challenges depending on factors such as rate of penetration (ROP), transferring weight to a bit (e.g., weight on bit, WOB) due to friction, etc. A mud motor can be a positive displacement motor (PDM) that operates to drive a bit during directional drilling. A PDM operates as drilling fluid is pumped through it where the PDM converts hydraulic power of the drilling fluid into mechanical power to cause the bit to rotate. A PDM can operate in a so-called sliding mode, when the drillstring is not rotated from the surface.

A RSS can drill directionally where there is continuous rotation from surface equipment, which can alleviate the sliding of a steerable motor (e.g., a PDM). A RSS may be deployed when drilling directionally (e.g., deviated, horizontal, or extended-reach wells). A RSS can aim to minimize interaction with a borehole wall, which can help to preserve borehole quality. A RSS can aim to exert a relatively consistent side force akin to stabilizers that rotate with the drillstring or orient the bit in the desired direction while continuously rotating at the same number of rotations per minute as the drillstring.

The LWD module 254 may be housed in a suitable type of drill collar and can contain one or a plurality of selected types of logging tools. It will also be understood that more than one LWD and/or MWD module can be employed, for example, as represented at by the module 256 of the drillstring assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As mentioned, a steerable system can be or include an RSS. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG framework. As an example, the TECHLOG framework can be interoperable with one or more other frameworks such as, for example, the PETREL framework.

Figure 3:
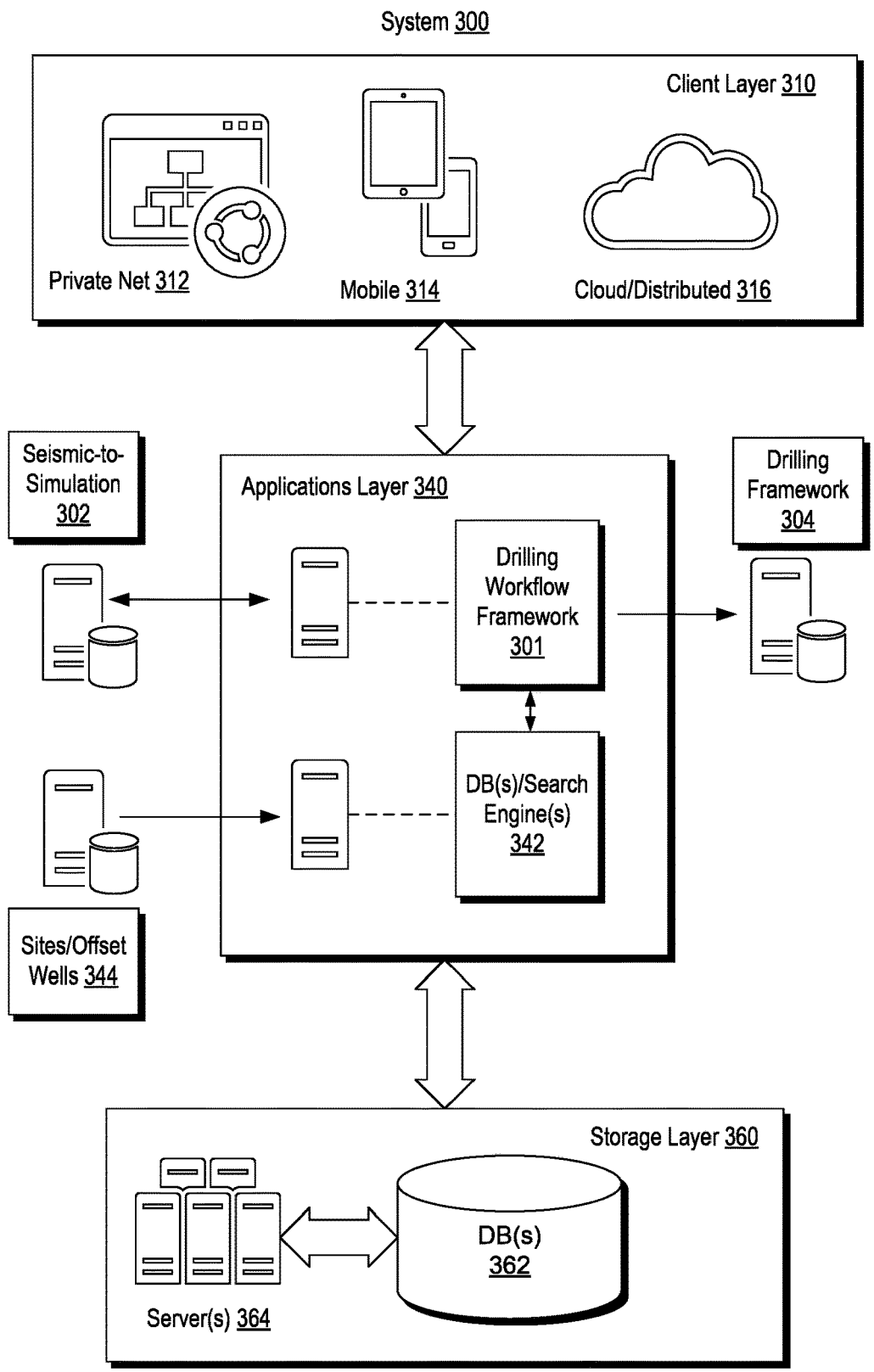
FIG. 3 illustrates an example of a system.

FIG. 3 shows an example of a system 300 that includes a drilling workflow framework 301, a seismic-to-simulation framework 302, a drilling framework 304, a client layer 310, an applications layer 340 and a storage layer 360. As shown the client layer 310 can be in communication with the applications layer 340 and the applications layer 340 can be in communication with the storage layer 360.

The client layer 310 can include features that allow for access and interactions via one or more private networks 312, one or more mobile platforms and/or mobile networks 314 and via the "cloud" 316, which may be considered to include distributed equipment that forms a network such as a network of networks.

In the example of FIG. 3, the applications layer 340 includes the drilling workflow framework 301. The applications layer 340 also includes a database management component 342 that includes one or more search engines modules.

As an example, the database management component 342 can include one or more search engine modules that provide for searching one or more information that may be stored in one or more data repositories. As an example, the STUDIO E&P knowledge environment (Schlumberger Ltd., Houston, Tex.) includes STUDIO FIND search functionality, which provides a search engine. The STUDIO FIND search functionality also provides for indexing content, for example, to create one or more indexes. As an example, search functionality may provide for access to public content, private content or both, which may exist in one or more databases, for example, optionally distributed and accessible via an intranet, the Internet or one or more other networks. As an example, a search engine may be configured to apply one or more filters from a set or sets of filters, for example, to enable users to filter out data that may not be of interest.

As an example, a framework may provide for interaction with a search engine and, for example, associated features such as features of the STUDIO FIND search functionality. As an example, a framework may provide for implementation of one or more spatial filters (e.g., based on an area viewed on a display, static data, etc.). As an example, a search may provide access to dynamic data (e.g., "live" data from one or more sources), which may be available via one or more networks (e.g., wired, wireless, etc.). As an example, one or more modules may optionally be implemented within a framework or, for example, in a manner operatively coupled to a framework (e.g., as an add-on, a plug-in, etc.). As an example, a module for structuring search results (e.g., in a list, a hierarchical tree structure, etc.) may optionally be implemented within a framework or, for example, in a manner operatively coupled to a framework (e.g., as an add-on, a plug-in, etc.).

In the example of FIG. 3, the applications layer 340 can include communicating with one or more resources such as, for example, the seismic-to-simulation framework 302, the drilling framework 304 and/or one or more sites, which may be or include one or more offset wellsites. As an example, the applications layer 340 may be implemented for a particular wellsite where information can be processed as part of a workflow for operations such as, for example, operations performed, being performed and/or to be performed at the particular wellsite. As an example, an operation may involve directional drilling, for example, via geosteering.

In the example of FIG. 3, the storage layer 360 can include various types of data, information, etc., which may be stored in one or more databases 362. As an example, one or more servers 364 may provide for management, access, etc., to data, information, etc., stored in the one or more databases 462. As an example, the database management component 342 may provide for searching as to data, information, etc., stored in the one or more databases 362.

As an example, the database management component 342 may include features for indexing, etc. As an example, information may be indexed at least in part with respect to wellsite. For example, where the applications layer 440 is implemented to perform one or more workflows associated with a particular wellsite, data, information, etc., associated with that particular wellsite may be indexed based at least in part on the wellsite being an index parameter (e.g., a search parameter).

As an example, the system 300 of FIG. 3 may be implemented to perform one or more portions of one or more workflows associated with the system 200 of FIG. 2. As an example, the drilling workflow framework 301 may interact with a technical data framework and the drilling framework 304 before, during and/or after performance of one or more drilling operations. In such an example, the one or more drilling operations may be performed in a geologic environment (see, e.g., the environment 150 of FIG. 1) using one or more types of equipment (see, e.g., equipment of FIGS. 1 and 2).

As an example, an architecture utilized in a system such as, for example, the system 300 may include features of the AZURE architecture (Microsoft Corporation, Redmond, Wash.). As an example, a cloud portal block can include one or more features of an AZURE portal that can manage, mediate, etc. access to one or more services, data, connections, networks, devices, etc. As an example, the system 300 may include features of the GOOGLE cloud architecture (Google, Mountain View, Calif.).

As an example, the system 300 can include a cloud computing platform and infrastructure, for example, for building, deploying, and managing applications and services (e.g., through a network of datacenters, etc.). As an example, such a cloud platform may provide PaaS and IaaS services and support one or more different programming languages, tools and frameworks, etc.

Figure 4:
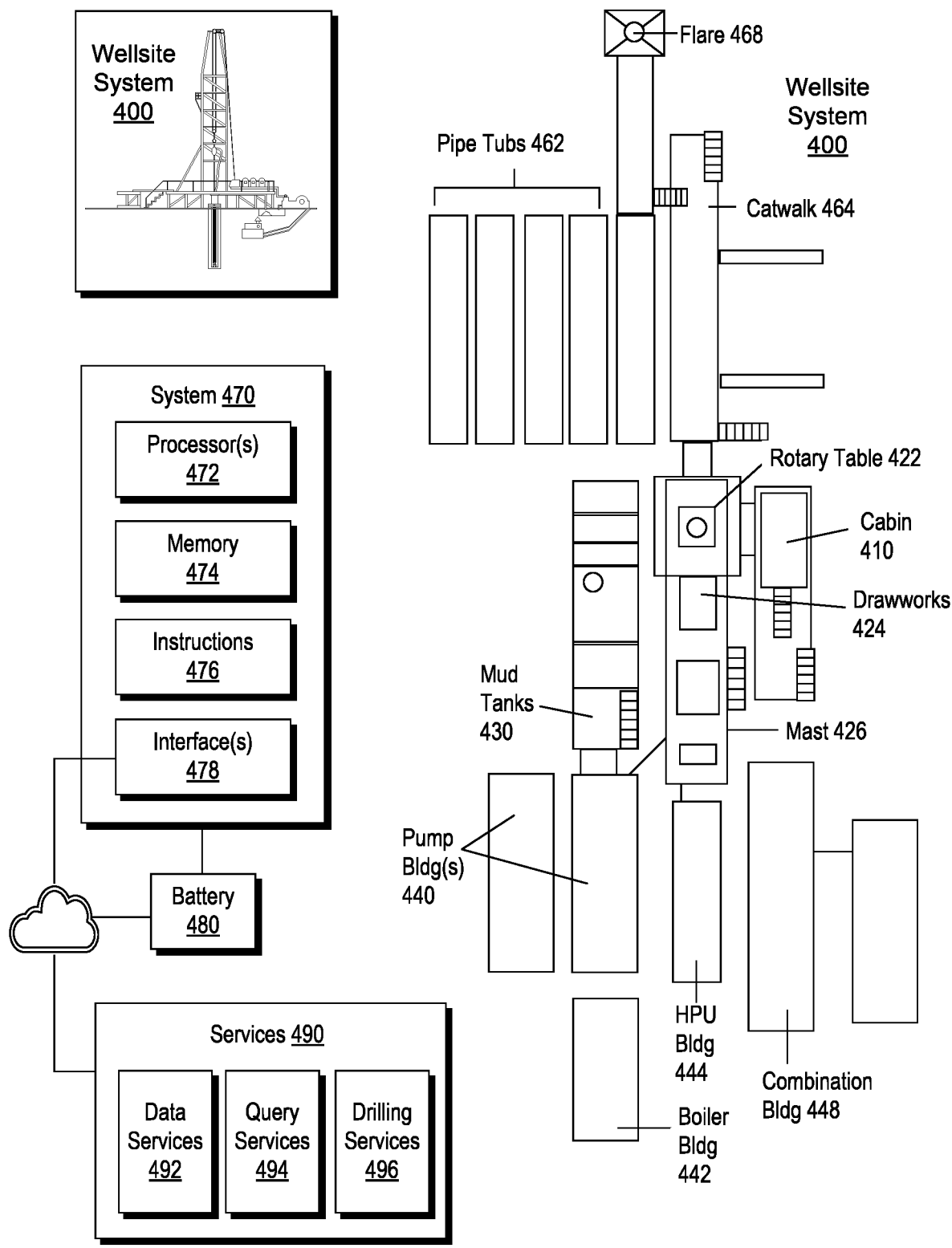
FIG. 4 illustrates an example of a system.

FIG. 4 shows an example of a wellsite system 400, specifically, FIG. 4 shows the wellsite system 400 in an approximate side view and an approximate plan view along with a block diagram of a system 470.

In the example of FIG. 4, the wellsite system 400 can include a cabin 410, a rotary table 422, drawworks 424, a mast 426 (e.g., optionally carrying a top drive, etc.), mud tanks 430 (e.g., with one or more pumps, one or more shakers, etc.), one or more pump buildings 440, a boiler building 442, an HPU building 444 (e.g., with a rig fuel tank, etc.), a combination building 448 (e.g., with one or more generators, etc.), pipe tubs 462, a catwalk 464, a flare 468, etc. Such equipment can include one or more associated functions and/or one or more associated operational risks, which may be risks as to time, resources, and/or humans.

As shown in the example of FIG. 4, the wellsite system 400 can include a system 470 that includes one or more processors 472, memory 474 operatively coupled to at least one of the one or more processors 472, instructions 476 that can be, for example, stored in the memory 474, and one or more interfaces 478. As an example, the system 470 can include one or more processor-readable media that include processor-executable instructions executable by at least one of the one or more processors 472 to cause the system 470 to control one or more aspects of the wellsite system 400. In such an example, the memory 474 can be or include the one or more processor-readable media where the processor-executable instructions can be or include instructions. As an example, a processor-readable medium can be a computer-readable storage medium that is not a signal and that is not a carrier wave.

FIG. 4 also shows a battery 480 that may be operatively coupled to the system 470, for example, to power the system 470. As an example, the battery 480 may be a back-up battery that operates when another power supply is unavailable for powering the system 470. As an example, the battery 480 may be operatively coupled to a network, which may be a cloud network. As an example, the battery 480 can include smart battery circuitry and may be operatively coupled to one or more pieces of equipment via a SMBus or other type of bus.

In the example of FIG. 4, services 490 are shown as being available, for example, via a cloud platform. Such services can include data services 492, query services 494 and drilling services 496. As an example, the services 490 may be part of a system such as the system 300 of FIG. 3.

As an example, a system such as, for example, the system 300 of FIG. 3 may be utilized to perform a workflow. Such a system may be distributed and allow for collaborative workflow interactions and may be considered to be a platform (e.g., a framework for collaborative interactions, etc.).

As an example, a workflow can commence with an evaluation stage, which may include a geological service provider evaluating a formation. As an example, a geological service provider may undertake the formation evaluation using a computing system executing a software package tailored to such activity; or, for example, one or more other suitable geology platforms may be employed (e.g., alternatively or additionally). As an example, the geological service provider may evaluate the formation, for example, using earth models, geophysical models, basin models, petrotechnical models, combinations thereof, and/or the like. Such models may take into consideration a variety of different inputs, including offset well data, seismic data, pilot well data, other geologic data, etc. The models and/or the input may be stored in the database maintained by the server and accessed by the geological service provider.

As an example, a workflow may progress to a geology and geophysics ("G&G") service provider, which may generate a well trajectory, which may involve execution of one or more G&G software packages. Examples of such software packages include the PETREL framework. As an example, a G&G service provider may determine a well trajectory or a section thereof, based on, for example, one or more model(s) provided by a formation evaluation, and/or other data, e.g., as accessed from one or more databases (e.g., maintained by one or more servers, etc.). As an example, a well trajectory may take into consideration various "basis of design" (BOD) constraints, such as general surface location, target (e.g., reservoir) location, and the like. As an example, a trajectory may incorporate information about tools, bottom-hole assemblies, casing sizes, etc., that may be used in drilling the well. A well trajectory determination may take into consideration a variety of other parameters, including risk tolerances, fluid weights and/or plans, bottom-hole pressures, drilling time, etc.

As an example, a workflow may progress to a first engineering service provider (e.g., one or more processing machines associated therewith), which may validate a well trajectory and, for example, relief well design. Such a validation process may include evaluating physical properties, calculations, risk tolerances, integration with other aspects of a workflow, etc. As an example, one or more parameters for such determinations may be maintained by a server and/or by the first engineering service provider; noting that one or more model(s), well trajectory(ies), etc. may be maintained by a server and accessed by the first engineering service provider. For example, the first engineering service provider may include one or more computing systems executing one or more software packages. As an example, where the first engineering service provider rejects or otherwise suggests an adjustment to a well trajectory, the well trajectory may be adjusted or a message or other notification sent to the G&G service provider requesting such modification.

As an example, one or more engineering service providers (e.g., first, second, etc.) may provide a casing design, bottom-hole assembly (BHA) design, fluid design, and/or the like, to implement a well trajectory. In some embodiments, a second engineering service provider may perform such design using one of more software applications. Such designs may be stored in one or more databases maintained by one or more servers, which may, for example, employ STUDIO framework tools, and may be accessed by one or more of the other service providers in a workflow.

As an example, a second engineering service provider may seek approval from a third engineering service provider for one or more designs established along with a well trajectory. In such an example, the third engineering service provider may consider various factors as to whether the well engineering plan is acceptable, such as economic variables (e.g., oil production forecasts, costs per barrel, risk, drill time, etc.), and may request authorization for expenditure, such as from the operating company's representative, well-owner's representative, or the like. As an example, at least some of the data upon which such determinations are based may be stored in one or more database maintained by one or more servers. As an example, a first, a second, and/or a third engineering service provider may be provided by a single team of engineers or even a single engineer, and thus may or may not be separate entities.

As an example, where economics may be unacceptable or subject to authorization being withheld, an engineering service provider may suggest changes to casing, a bottom-hole assembly, and/or fluid design, or otherwise notify and/or return control to a different engineering service provider, so that adjustments may be made to casing, a bottom-hole assembly, and/or fluid design. Where modifying one or more of such designs is impracticable within well constraints, trajectory, etc., the engineering service provider may suggest an adjustment to the well trajectory and/or a workflow may return to or otherwise notify an initial engineering service provider and/or a G&G service provider such that either or both may modify the well trajectory.

As an example, a workflow can include considering a well trajectory, including an accepted well engineering plan, and a formation evaluation. Such a workflow may then pass control to a drilling service provider, which may implement the well engineering plan, establishing safe and efficient drilling, maintaining well integrity, and reporting progress as well as operating parameters. As an example, operating parameters, formation encountered, data collected while drilling (e.g., using logging-while-drilling or measurement-while-drilling technology), may be returned to a geological service provider for evaluation. As an example, the geological service provider may then re-evaluate the well trajectory, or one or more other aspects of the well engineering plan, and may, in some cases, and potentially within predetermined constraints, adjust the well engineering plan according to the real-life drilling parameters (e.g., based on acquired data in the field, etc.).

Whether the well is entirely drilled, or a section thereof is completed, depending on the specific embodiment, a workflow may proceed to a post review.

As an example, a post review may include reviewing drilling performance. As an example, a post review may further include reporting the drilling performance (e.g., to one or more relevant engineering, geological, or G&G service providers).

Various activities of a workflow may be performed consecutively and/or may be performed out of order (e.g., based partially on information from templates, nearby wells, etc. to fill in gaps in information that is to be provided by another service provider). As an example, undertaking one activity may affect the results or basis for another activity, and thus may, either manually or automatically, call for a variation in one or more workflow activities, work products, etc. As an example, a server may allow for storing information on a central database accessible to various service providers where variations may be sought by communication with an appropriate service provider, may be made automatically, or may otherwise appear as suggestions to the relevant service provider. Such an approach may be considered to be a holistic approach to a well workflow, in comparison to a sequential, piecemeal approach.

As an example, various actions of a workflow may be repeated multiple times during drilling of a wellbore. For example, in one or more automated systems, feedback from a drilling service provider may be provided at or near real-time, and the data acquired during drilling may be fed to one or more other service providers, which may adjust its piece of the workflow accordingly. As there may be dependencies in other areas of the workflow, such adjustments may permeate through the workflow, e.g., in an automated fashion. In some embodiments, a cyclic process may additionally or instead proceed after a certain drilling goal is reached, such as the completion of a section of the wellbore, and/or after the drilling of the entire wellbore, or on a per-day, week, month, etc. basis.

Well planning can include determining a path of a well that can extend to a reservoir, for example, to economically produce fluids such as hydrocarbons therefrom. Well planning can include selecting a drilling and/or completion assembly which may be used to implement a well plan. As an example, various constraints can be imposed as part of well planning that can impact design of a well. As an example, such constraints may be imposed based at least in part on information as to known geology of a subterranean domain, presence of one or more other wells (e.g., actual and/or planned, etc.) in an area (e.g., consider collision avoidance), etc. As an example, one or more constraints may be imposed based at least in part on characteristics of one or more tools, components, etc. As an example, one or more constraints may be based at least in part on factors associated with drilling time and/or risk tolerance.

Figure 5:
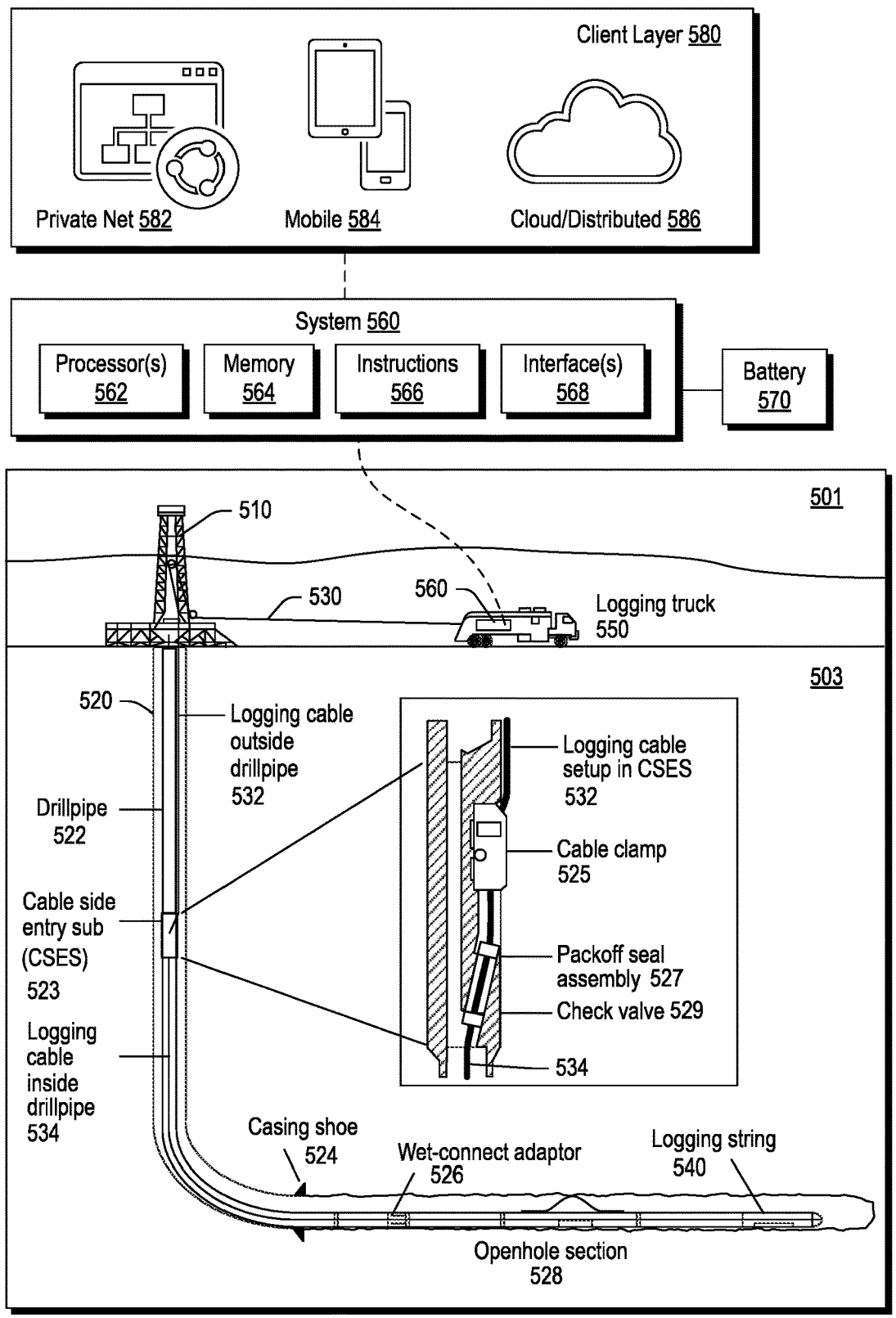
FIG. 5 illustrates an example of a system.

FIG. 5 shows an example of an environment 501 that includes a subterranean portion 503 where a rig 510 is positioned at a surface location above a bore 520. In the example of FIG. 5, various wirelines services equipment can be operated to perform one or more wirelines services including, for example, acquisition of data from one or more positions within the bore 520.

In the example of FIG. 5, the bore 520 includes drillpipe 522, a casing shoe, a cable side entry sub (CSES) 523, a wet-connector adaptor 526 and an openhole section 528. As an example, the bore 520 can be a vertical bore or a deviated bore where one or more portions of the bore may be vertical and one or more portions of the bore may be deviated, including substantially horizontal.

In the example of FIG. 5, the CSES 523 includes a cable clamp 525, a packoff seal assembly 527 and a check valve 529. These components can provide for insertion of a logging cable 530 that includes a portion 532 that runs outside the drillpipe 522 to be inserted into the drillpipe 522 such that at least a portion 534 of the logging cable runs inside the drillpipe 522. In the example of FIG. 5, the logging cable 530 runs past the wet-connect adaptor 526 and into the openhole section 528 to a logging string 540.

As shown in the example of FIG. 5, a logging truck 550 (e.g., a wirelines services vehicle) can deploy the wireline 530 under control of a system 560. As shown in the example of FIG. 5, the system 560 can include one or more processors 562, memory 564 operatively coupled to at least one of the one or more processors 562, instructions 566 that can be, for example, stored in the memory 564, and one or more interfaces 568. As an example, the system 560 can include one or more processor-readable media that include processor-executable instructions executable by at least one of the one or more processors 562 to cause the system 560 to control one or more aspects of equipment of the logging string 540 and/or the logging truck 550. In such an example, the memory 564 can be or include the one or more processor-readable media where the processor-executable instructions can be or include instructions. As an example, a processor-readable medium can be a computer-readable storage medium that is not a signal and that is not a carrier wave.

FIG. 5 also shows a battery 570 that may be operatively coupled to the system 560, for example, to power the system 560. As an example, the battery 570 may be a back-up battery that operates when another power supply is unavailable for powering the system 560 (e.g., via a generator of the wirelines truck 550, a separate generator, a power line, etc.). As an example, the battery 570 may be operatively coupled to a network, which may be a cloud network. As an example, the battery 570 can include smart battery circuitry and may be operatively coupled to one or more pieces of equipment via a SMBus or other type of bus.

As an example, the system 560 can be operatively coupled to a client layer 580. In the example of FIG. 5, the client layer 580 can include features that allow for access and interactions via one or more private networks 582, one or more mobile platforms and/or mobile networks 584 and via the "cloud" 586, which may be considered to include distributed equipment that forms a network such as a network of networks. As an example, the system 560 can include circuitry to establish a plurality of connections (e.g., sessions). As an example, connections may be via one or more types of networks. As an example, connections may be client-server types of connections where the system 560 operates as a server in a client-server architecture. For example, clients may log-in to the system 560 where multiple clients may be handled, optionally simultaneously.

Figure 6:
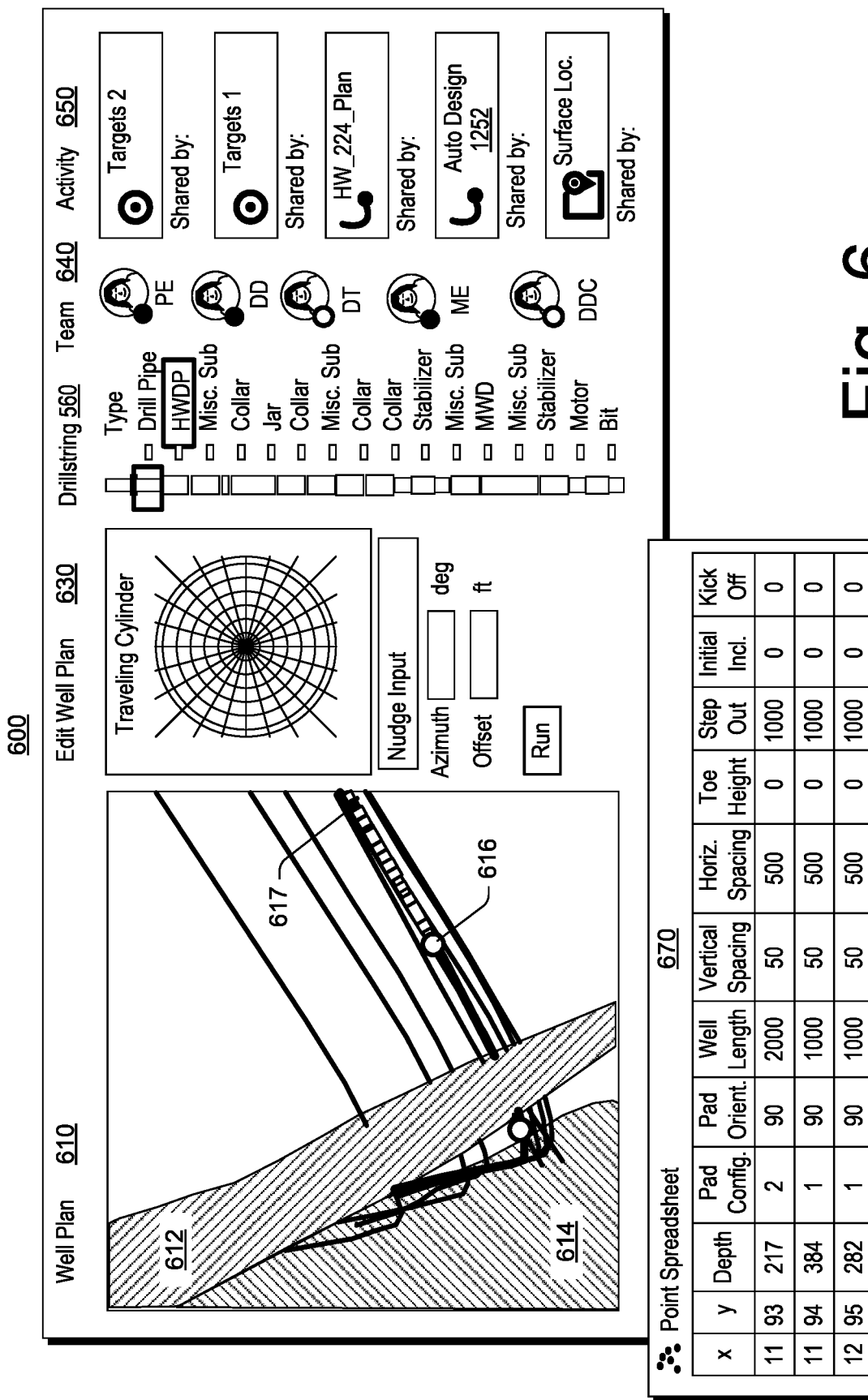
FIG. 6 illustrates an example of a graphical user interface.

FIG. 6 shows an example of a graphical user interface (GUI) 600 that includes information associated with a well plan. Specifically, the GUI 600 includes a panel 610 where surfaces representations 612 and 614 are rendered along with well trajectories where a location 616 can represent a position of a drillstring 617 along a well trajectory. The GUI 600 may include one or more editing features such as an edit well plan set of features 630. The GUI 600 may include information as to individuals of a team 640 that are involved, have been involved and/or are to be involved with one or more operations. The GUI 600 may include information as to one or more activities 650. As shown in the example of FIG. 6, the GUI 600 can include a graphical control of a drillstring 660 where, for example, various portions of the drillstring 660 may be selected to expose one or more associated parameters (e.g., type of equipment, equipment specifications, operational history, etc.). FIG. 6 also shows a table 670 as a point spreadsheet that specifies information for a plurality of wells. For example, the point spreadsheet can include coordinates, dimensions, etc., that specify a trajectory of a well, spacing of wells, etc.

Figure 7:
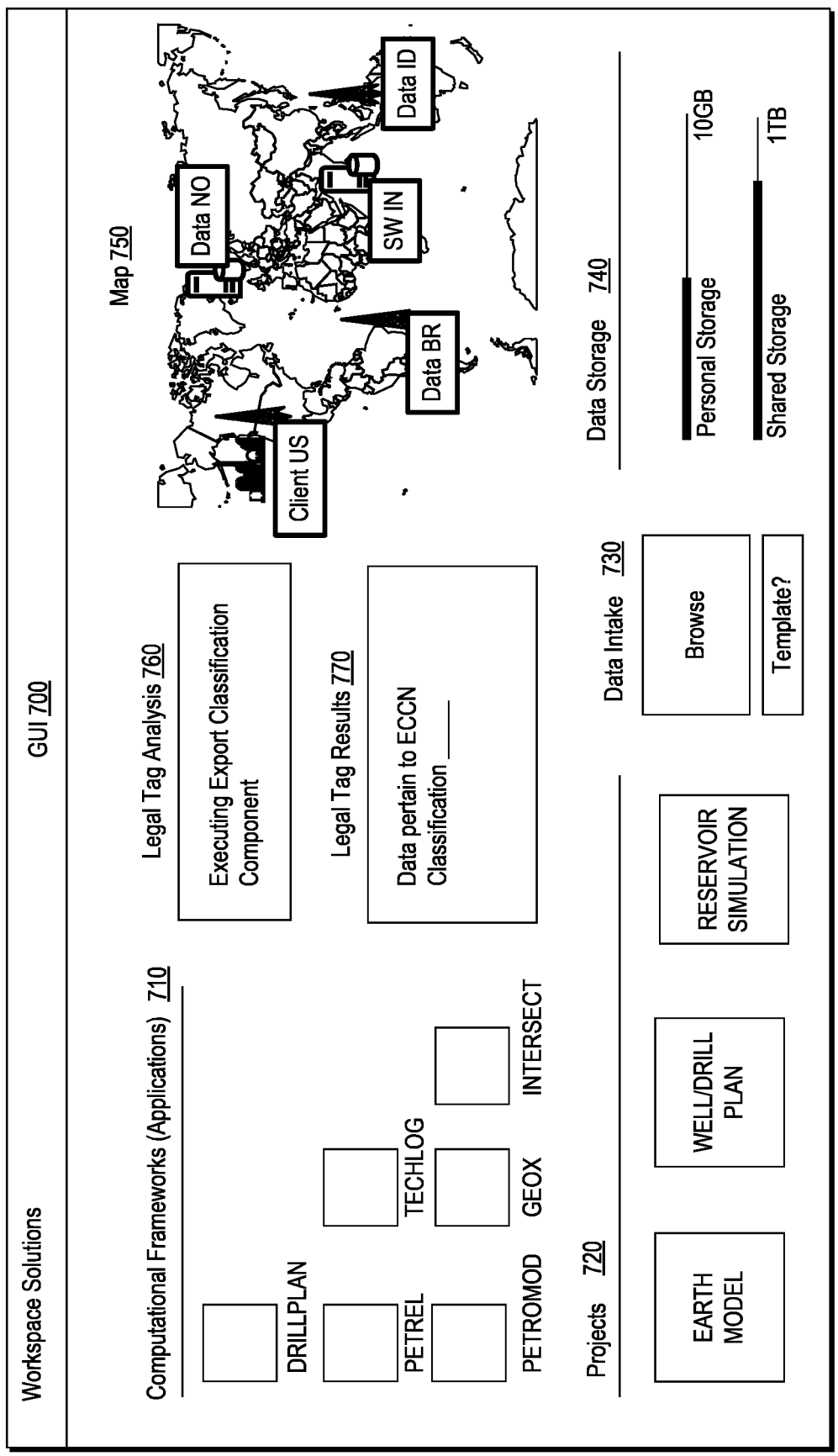
FIG. 7 illustrates an example of a graphical user interface.

FIG. 7 shows an example of a GUI 700 that includes various features that can be part of a workspace. For example, a computational framework area 710 includes icons that represent various types of computational frameworks such as a drilling plan framework, a seismic-to-simulation framework (e.g., PETREL framework, Schlumberger Limited, Houston, Tex.), a measurements framework (e.g., TECHLOG framework, Schlumberger Limited, Houston, Tex.), a mechanical earth modeling (MEM) framework (PETROMOD framework, Schlumberger Limited, Houston, Tex.), an exploration risk, resource, and value assessment framework (e.g., GEOX, Schlumberger Limited, Houston, Tex.), and a reservoir simulation framework (INTERSECT, Schlumberger Limited, Houston, Tex.). As an example, one or more computational frameworks may be suitable for use in a system such as the system 300 of FIG. 3, the wellsite system 400 of FIG. 4, the system 500 of FIG. 5, etc.

In the example of FIG. 7, the GUI 700 can include a projects area 720 for various types of projects, a data intake area 730 for ingestion of data, a data storage area 740 for rendering graphics associated with data storage, a map area 750 for rendering a map, a legal tag analysis area 760 for entering and/or rendering information as to one or more legal tag analyses, a legal tag result(s) area 770 for rendering an analysis result or results. As shown, the map 750 can be utilized to render various types of information, which may be associated with one or more legal tag analyses. For example, an export classification component can analyze data input via the data intake area 730 to determine geographic locations of various entities, data, services, etc., as may be associated with a project, data to be ingested for the project, etc. As shown, a client may be in the US, data may be in Norway, Brazil and Indonesia and software executing on a computing device may be in India. Such analysis results can be intermediate results as to a legal tag result, which may be according to one or more types of regulations (e.g., US Department of Commerce, Export Classification Control Number (ECCN), etc.).

As an example, the areas 760 and 770 may be part of a compliance framework, which may include one or more application programming interfaces (APIs). As an example, the areas 760 and 770 can be utilized to predict and set property values for legal tags associated with a project, for example, data and/or resources to be utilized to perform one or more workflows of a project. As example, one or more results of a project may be subject to one or more property values of a legal tag or tags. As an example, one or more areas of the GUI 700 may be operatively coupled to a legal tag database that may optionally be maintained separately with restricted access.

As an example, a legal tag can be dynamic, for example, to cause one or more prohibitions on communication (e.g., with one or more network interface controllers, etc.), to cause rendering of information to the map 750, to cause issuance of one or more notifications, to cause deletion of one or more types of data (e.g., personally identifiable data, etc.), to cause retention of one or more types of data for a period of time, to cause deletion of one or more types of data responsive to an expiration data, etc.

In the example of FIG. 7, a data file (e.g., as an icon, as a URL, etc.) can be loaded via the data intake area 730 such that data of the data file is ingested for utilization in one or more projects, which may utilize one or more of the computational frameworks. In the example of FIG. 7, the types of data or data files that can be ingested can be varied. As an example, the data intake area 730 and underlying control(s) can be a portal, which may be a secure portal, through which data are to "pass" before they can be utilized via one or more of the computational frameworks and/or projects.

In the example of FIG. 7, the data intake area 730 can be operatively coupled to one or more remote resources. For example, the GUI 700 may expose a remote drive or drives such as a cloud-based drive. As an example, a remote resource may be managed using a cloud platform. For example, consider a GOOGLE cloud platform, an AMAZON WEB SERVICES (AWS) cloud platform, a MICROSOFT AZURE cloud platform, etc.

As an example, a cloud platform may provide for object storage, block storage, file storage (e.g., a shared filesystem), managed SQL databases, NoSQL databases, etc. As to types of data, consider one or more of text, images, pictures, videos, audio, objects, blobs, structured data, unstructured data, low latency data, high-throughput data, time series data, semi-structured application data, hierarchical data, durable key-value data, etc. For example, particular data may be utilized in visual renderings and demand low latency such that glitches do not occur during buffering, rendering, interactive manipulations, etc. As an example, particular data may be generated as a binary large object (blob) for purposes of transmission, security, storage organization, etc. As an example, a sensor may generate time series data, which may be regular and/or irregular in time and which may or may not include a "global" time marker (e.g., time stamps, etc.). As an example, data may be in a wellsite information transfer standard markup language (WITSML) standard, which is a standard utilized in various operations including rig operations. As an example, data may be serially transferred ASCII data.

In the example of FIG. 7, one or more of the computational frameworks may be local and/or one or more of the computational frameworks may be remote. For example, the GUI 700 may be rendered locally using a display operatively coupled to a workstation (e.g., laptop, desktop, etc.) where the workstation includes executable instructions for instantiating a computational framework and/or the GUI 700 may be rendered locally using a display operatively coupled to or part of a computing device that includes one or more network interfaces that can operatively couple to one or more remote resources that can instantiate a computational framework. For example, consider a remote resource being a cloud-based resource. As an example, controls of the data intake area 730 may operate in cloud-based resources that are in a cloud platform that is common with data to be ingested and/or one or more computational frameworks to be utilized, which may consume ingested data. As an example, controls of the areas 750, 760 and 770 may operate in cloud-based resources that are in a cloud platform that is common with one or more computational frameworks to be utilized. As mentioned, legal tag property values may be stored with restrictions, for example, to help protect them against tampering.

As explained, some features may be local and some features may be remote and various features may be within a common platform such as a cloud platform.

Figure 8:
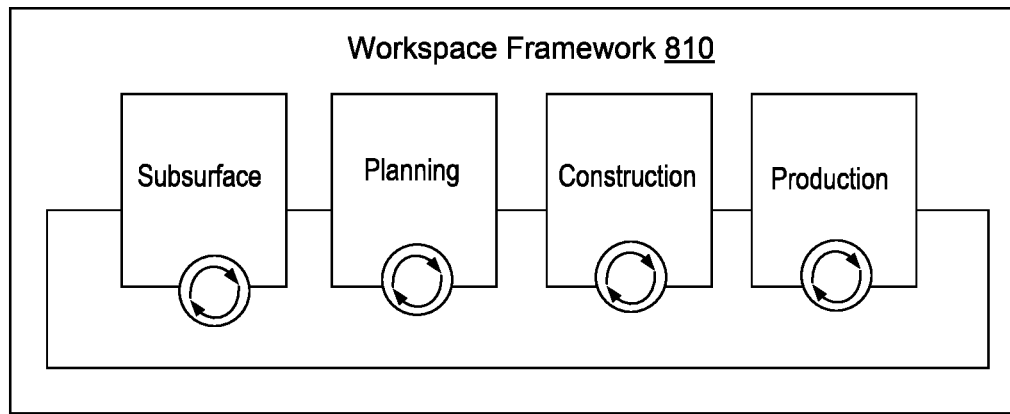
FIG. 8 illustrates an example of a system and an example of a graphical user interface.
Figure 8:
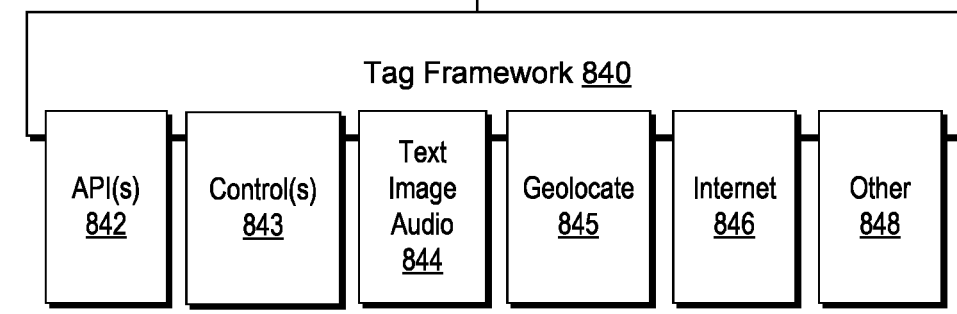

FIG. 8 shows an example of a system 800 and an example of a graphical user interface 850 as may be part of the system 800. As shown, the system 800 includes a workspace framework 810, an interface 820 and a legal tag framework 840. As shown, the legal tag framework 840 can be operatively coupled to the workspace framework 810 via the interface. As an example, a user may utilize the GUI 700 of FIG. 7 to cause the system 800 of FIG. 8 to generate and/or utilize one or more legal tags and/or one or more legal tag property values.

In the example of FIG. 8, the legal tag framework 840 can include various components such as an API component 842, a control component 843, a text, image and audio component 844, a geolocation component 845, an Internet component 846 and one or more other components 848. Such components can be utilized with one or more other components, which may be for analyzing data (e.g., data analysis components). As an example, the API component 842 can allow for accessing regulatory data (e.g., Federal Register, etc.), the control component 843 can provide for implementation of one or more control actions (e.g., deletion of data, etc.), the text, image and audio component 844 can provide for analysis of text data, image data and/or audio data (e.g., for extracting, redacting, etc.), the geolocation component 845 can provide for geolocating (e.g., determining one or more geographical locations using one or more types of data), and the Internet component 846 can provide for analysis of one or more types of Internet related data (e.g., IP addresses, MAC addresses, traces, etc.).

As an example, ingestion pipeline services can be utilized to dynamically orchestrate data curation through a configurable, extensible smart "pipeline" encompassing the breadth of data management stage gates (e.g., ingestion, enrichment, classification, data quality, indexing) and can be extensible beyond the stage gates, for example, to handle unforeseen datatypes and/or workflows.

As an example, an extensible pipeline service can be leveraged by documenting and persisting incoming data in a known, consistent, manner according to a schema, representing various aspects of the data. For example, consider aspects such as source of data, data semantics (what the data represent such as an object and/or an entity of an Earth model, of a computational framework, etc.), representative properties (e.g., of an object, entity, etc.), representative attributes (e.g., of an object, entity, etc.), data frame of reference, data relationship(s), etc.

As to source of data, consider the PROSOURCE E&P data management system (Schlumberger Limited, Houston, Tex.), which provides management, visualization, and delivery capabilities for various types of data to streamline various workflows. Such a system can provide real-time capabilities to proactively manage wellbore operations using vendor-neutral data aggregation features. As an example, an aggregator system can be an operations equipment ready system that can be integrated into a system for a desired location with data connectivity (e.g., rig equipment installation, logging equipment installation, seismic equipment installation, laboratory equipment installation, etc.). As an example, a real-time data system can collect multiple data types, which may include customized data types according to customized data formats and/or one or more of the following data formats: WITS (serial, file, TCP, and http); WITSML (1.1, 1.2, 1.3.1.1 client and server); OPC-DA and OPC-UA (clients); DLIS; MAXWELL; and CSV.

As to a semantic understanding of what the data actually represents, consider data that represents a wellbore as an entity, which may be an object in an Earth model of a computational framework. As to a deterministic understanding of the various properties or attributes of the entity, these may vary from source to source. As to a deterministic understanding of the frame of reference of source data, such an understanding can help to facilitate frictionless (e.g., optionally lossless) consumption. For example, various types of data may be compressed or uncompressed; in 6-bit, 12-bit, 24-bit, 32-bit, 48-bit, 64-bit or other bit depth; in a color standard (e.g., RGB, HCL, LUV, etc.); in a time series, etc. As an example, an ingestion service may provide for one or more options and may automatically select an option as to how data are to be ingested, which may depend on one or more types of computational frameworks that can consume the particular data. For example, where a computational framework is limited to a particular bit-depth, the ingestion service may "downsize" the data (e.g., from 48-bit to 12-bit). As an example, where a computational framework is limited to a particular file type (e.g., JPEG, BMP, TIFF, etc.), the ingestion service may include one or more filters, converters, etc., that act to assure the data ingested is provided in a manner suitable for direct use by the computational framework. As to a deterministic understanding of how data relates to other data (e.g., in a common dataset or another dataset), such an approach may aim to heuristically determine (e.g., through relationship mining) one or more connection points of interest. For example, a rig identifier may be utilized to establish a connection point of interest between data. In such an example, it may be determined that the rig identifier corresponds to a wellsite with longitude and latitude and that the rig corresponding to the rig identifier was at that wellsite for a number of weeks. In such an example, particular data associated with the rig identifier can be segmented in time for a time associated with the wellsite. With the wellsite known for the particular data, it may be further associated with other data for that wellsite.

As an example, ingestion services can include GIS features, which can include GIS backend and frontend features. For example, an ingestion service can access an ArcGIS server and can include an ArcGIS server compatible client. In such an example, one or more ORACLE components may be included (e.g., a 64-bit ORACLE client such as the ORACLE client for an ArcGIS client. As to a backend, consider the ArcGIS server for the MICROSOFT .NET framework. As an example, resources local and/or remote can include multiple core processing equipment. As an example, services can include an ArcGIS Desktop Basic component.

As an example, an ingestion service can access GIS resources during ingestion to provide for rendering of GIS data in text, graphical and/or image form to allow a user to see a geographic location as may be associated with data being ingested. While a GIS type of system is mentioned, a lightweight mapping service may be utilized for an informative but a user experience that is of lesser richness. For example, with a GIS type of system, a user may be able to see a wellsite at one or more times, which can include a past time from a past satellite or other image and a latest time from a latest satellite or other image. As to imagery, it may be available in one or more forms (e.g., visible, IR, UV, microwave, etc.).

As an example, a system can include a dataset descriptor generator. For example, consider a PYTHON language based utility for generating metadata for a given input file such that the input file can be processed effectively (e.g., ingested, enriched, indexed, etc.).

The PYTHON language is a multi-paradigm programming language that supports object-oriented programming and structured programming. Features in the PYTHON language can support functional programming and aspect-oriented programming. The PYTHON language uses dynamic typing, and a combination of reference counting and a cycle-detecting garbage collector for memory management. It also features dynamic name resolution (late binding), which binds method and variable names during program execution. The PYTHON language includes filter( ), map( ), and reduce( ) functions; list comprehensions, dictionaries, and sets; and generator expressions. The PYTHON language library includes modules such as itertools and functools that can implement various functional tools.

As an example, a person may be represented as follows in the JSON format:
{
  "firstName": "John",
  "lastName": "Smith",
  "isAlive": true,
  "age": 27,
  "address": {
    "streetAddress": "21 2nd Street",
    "city": "New York",
    "state": "NY",
    "postalCode": "10021-3100"
  },
  "phoneNumbers": [
    {
      "type": "home",
      "number": "212 555-1234"
    }
  ]
}

As an example, a dataset descriptor can include generated metadata with details such as, for example, one or more of the following:

List of column names and their data types;
List of column names of type Latitude and Longitude to enable spatial indexing and discovery workflows;
List of columns that will act as primary "key" columns while processing file to enable matching workflows (enrichment);
List of columns frame of reference information (unit system, dimension, unit of measure, format, etc.);
List of columns that participate in specialized entity representations, consider an example for a trajectory as follows: columns that will act as Depth, Azimuth and Inclination; and
Data type mapping block enabling a user to specify how each type of column can be processed by one or more consuming services, such as indexing (for example, "int"→"double") for standardization.

As an example, a legal tag framework such as the legal tag framework 840 of FIG. 8 can utilize data as ingested and/or as otherwise accessible to generate appropriate legal tags (e.g., properties, property values, etc.). As an example, a legal tag framework such as the legal tag framework 840 of FIG. 8 may be utilized to assess one or more existing legal tags as associated with data and/or to suggest one or more legal tags (e.g., properties, property values, etc.).

As to the example GUI 850 of FIG. 8, it can include various features associated with data (e.g., accessing data, etc.) and legal tags. In the example shown in FIG. 8, a source of data can be a computational framework such as the PETREL framework (e.g., entered, discoverable and/or selectable via a menu, a navigation feature, etc.), an entity type can be "wellbore" such that data include wellbore data (e.g., entered, discoverable and/or selectable via a menu, a navigation feature, etc.), and an data ingestion template can be a template that is suitable for ingesting the particular source and entity data such as, for example, a PETREL wellbore comma separated values template (e.g., "PETREL WB CSV"), which may be stored in a data store (e.g., entered, discoverable and/or selectable via a menu, a navigation feature, etc.).

In the example of FIG. 8, a data file may be accessed and uploaded where the data in the data file can be processed using the template or, for example, uploaded without using the template or, for example, uploaded while generating a template. For example, while the GUI 850 illustrates a template being selected, as an example, an option may exist to upload data without use of a template. As shown, per a legal tag graphical control 851, a legal tag can be utilized to tag at least a portion of the data, which may occur during or after upload.

As to a legal tag, a workflow can include generation of default tags as illustrated by an example of a graphical control 852, which may be rendered to a display and actuated for selection of a country or another action. As shown, an example of a legal tags graphical control 854 can be rendered for a selected country (e.g., Australia) where various options as to legal tags may exist. For example, consider one or more options to create a new legal tag, to select one or more private legal tags, to select one or more public legal tags, etc. As illustrated, a legal tag can be specified for private data and no personally identifiable data, for public data and no personal data, etc. As an example, a legal tag can provide information as to data types, data content, data restrictions, etc. As to data being private, such an indicator may be a type of security classification; whereas, other indicators may pertain to other types of classifications (e.g., export, people, contract, dates, etc.). In the example of FIG. 8, the approach is country-based; noting that one or more other types of approaches may be utilized. As mentioned, a country may be determined automatically, for example, via the geolocation component 845.

FIG. 8 further shows an example of a graphical control 856 that can be rendered to a display for rendering information associated with a legal tag (e.g., properties, property values, etc.). As an example, the graphical control 856 may be utilized for creating a new legal tag, reviewing an existing legal tag, reviewing an automatically generated legal tag, editing a legal tag (e.g., existing, new, automatically generated, etc.).

As shown in the example graphical control 856, a legal tag can include various properties that can have one or more corresponding property values. For example, country of origin (COO) can be a property with a value of a country such as "Australia" or "AU". As an example, accessed data may be a data set with data from one or more countries as COOs. In such an example, multiple instances of the graphical control 854 may be rendered, which may provide, for example, for partitioning the data set with respect to COO where legal tags may be associated with the data on a country-by-country basis.

As shown in the example of FIG. 8, some other examples of properties can include data type, originator, security classification, export classification, personal data, contract ID, expiration date, description, etc. Various types of partitioning may occur for one or more types of properties (e.g., multiple originators, multiple contract IDs, etc.). As shown, some values may be filled in (e.g., "Australia"), suggested (see, e.g., "?"), blank, etc. For example, consider an automated process that analyzes data to fill in, to suggest, to identify errors, to leave blank, etc., one or more property values and/or, for example, to fill in, to suggest, to identify errors, to leave blank, etc., one or more properties. In FIG. 8, the italicized values with a question mark ("?") represent an example of a manner of rendering suggested values, which a user may accept, interrogate, deny, etc. As to the blank fields, these may be due to an analysis not being able to confidently fill in or make a suggestion. As an example, color coding may be utilized such as green to represent filled in (e.g., high confidence), yellow to represent suggested and red to represent unknown, conflicting, etc.

As illustrated in the example graphical control 856, one or more types of analyses can help to guide a user in a workflow that involves one or more legal tags. As an example, the tag framework 840 may operate to ease burdens placed on a user, for example, by filling in, making suggestions, leaving blank, identifying errors, etc., as to one or more fields in a graphical control (e.g., a GUI) that pertains to legal tags. In the example of FIG. 8, the graphical control can include one or more actuatable features such as, for example, buttons, that can cause issuance of one or more instructions, commands, signals, etc. For example, consider the "Save" button, which may be actuated to save a legal tag with its associated properties and property values (e.g., as attributes of a legal tag, etc.). As an example, a saved legal tag or legal tags may be associated with data that is ingested and utilized in one or more computational frameworks (see, e.g., the GUI 700) where one or more legal tags may include instructional information that can dictate how data are processed, stored, transmitted or not, etc. As to storage, consider "private" data being stored in a particular manner such as with encryption, in a particular data store, etc. As to transmission or not, as mentioned, data may be restricted from transmission to or residence in (e.g., storage in) one or more countries, regions, etc. As to processing, as an example, data may be tagged to be processed for one or more purposes such as, for example, reporting to a governmental or other regulatory authority. In such an example, the reporting may be date and/or event triggered (e.g., consider quarterly reports to a government agency, which may be automatically generated and optionally automatically transmitted or transmitted after review, etc.).

As an example, the system 800 may operate to guide a user in determining what attributes are to be applied to a legal tag. In such an example, the system 800 may operate to determine, suggest, set, etc., legal tag properties, property values, etc.

In a manual process that is without guidance, a user may select "Create New" to create a new legal tag and then manually review and assess data to determine what that new legal tag is to specify. For example, the user may review accessed data, as processed by a template or not, to determine whether or not the accessed data include private data and personally identifiable data. In such an example, the user determines what legal aspects exist for data that have been ingested or that are to be ingested into a framework environment. Such an approach may be demanding, especially where data may include data of different formats, data in a language foreign to the user, data in multiple foreign languages, legal compliance as to different legal jurisdictions, business compliance as to different business entities, etc. A system such as the system 800, with the tag framework 840, can improve quality of legal tags and thereby improve downstream processes that may utilize tagged data, for example, such that data are transmissible to one or more countries, without improper personal data, etc. As mentioned, a legal tag can include information than can be utilized in a dynamic manner, for example, to restrict and/or permit transmissions, to issue notifications, etc. Such a system may provide greater confidence such that technical people can focus on technical tasks rather than compliance tasks, which may be considered to be non-productive tasks that lead to non-productive time (NPT).

Figure 9:
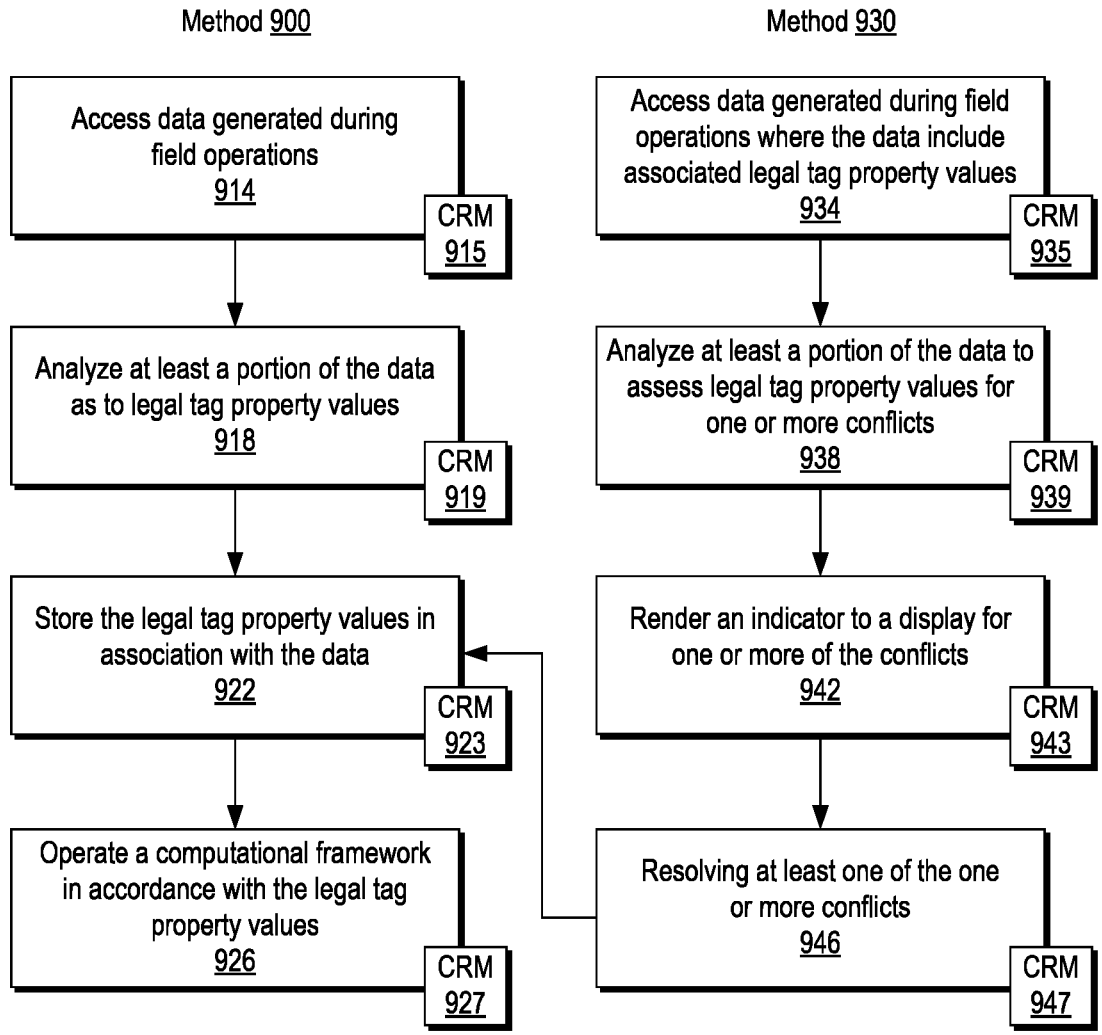
FIG. 9 illustrates an example of a method.
Figure 9:
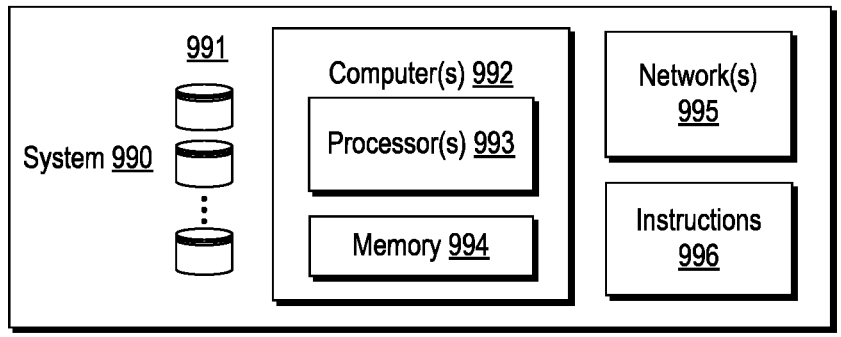

FIG. 9 shows an example of a method 900, an example of a method 930 and an example of a system 990. As to the method 900, it includes an access block 910 for accessing data generated during field operations; an analysis block 920 for analyzing at least a portion of the data as to legal tag property values, a storage block 930 for storing the legal tag property values in association with the data; and an operation block 940 for operating a computational framework in accordance with the legal tag property values. For example, one or more legal tag property values can control operation of a system such as the system 800, which may provide for use of one or more computational frameworks. Such control can be associated with a project that depends on data. As an example, a method can include permitting use of a portion of ingested data and prohibiting use of another portion of ingested data by the system 800, for example, depending on results of an analysis by the analysis block 920. As an example, control can extend to permissions and/or prohibitions associated with transmission of data and/or one or more results based thereon as produced by operation of the system 800. As an example, control can be for handling of data such as storage, maintenance, deletion, etc. As an example, control per a legal tag property value can be for deletion of data as associated with a project according to a date (e.g., or an event, etc.). For example, where a client of a tenant of the system 800 is subject to a project with an expiration date, data may be effectively deleted from a project workspace to prohibit access using the system 800 after that date unless the expiration date is reset, which may demand that data be re-analyzed.

As to data generated during field operations, it may include data as in the example geologic environment 120 of FIG. 1, data generated by equipment and/or use of equipment as in FIG. 1, FIG. 2, FIG. 3, FIG. 4, FIG. 5, etc., data associated with features of the GUI 600 of FIG. 6, etc.

As to the method 930, it includes an access block 934 for accessing data generated during field operations where the data include associated legal tag property values; an analysis block 938 for analyzing at least a portion of the data to assess at least a portion of the legal tag property values for one or more conflicts; a render block 942 for rendering an indicator to a display for one or more of the conflicts; and a resolution block 946 for resolving at least one of the one or more conflicts. The method 930 may continue, for example, at the storage block 922 of the method 900. In such an example, the storage block 922 may store revised legal tag information, revised data, etc., as may have been revised to resolve one or more of the conflicts. While property tag values are mentioned, the method 930 may analyze data as to legal tag properties, control information (e.g., as to processing, storage, transmission, etc.), etc.

In the method 900 and in the method 930, the blocks 918 and 938 can include analyzing using a variety of techniques that can generate one or more predictions as to what legal tag property values may be utilized to tag accessed data. Such an approach can include rendering one or more generated predictions to a display, which may be one or more suggestions that can be reviewed by a user and, if acceptable, adopted to tag accessed data (e.g., by setting of one or more legal tag property values, etc.). Through automated rendering of suggestions, a user workflow may be expedited, with some assurance of confidence in tags pertaining to legal compliance, etc. Such an approach can reduce user demand in navigating the compliance landscape (e.g., legal, business, etc.).

As an example, a data ingestion process may include proactively scanning ingested, tagged data, from a US data store where, upon analysis of at least a portion of the data, a latitude and a longitude are found that are actually from Mexico. In such an example, the process may issue a notification or otherwise indicate (e.g., via a GUI, etc.) that one or more legal tags, properties and/or property values are not necessarily representative of the data that has been tagged. As an example, where a business may include a personal name, a user may inappropriately believe that it is personally identifiable data; whereas, a system may be able to access one or more databases to make a comparison between the name and business names to determine that the name is a business name and acceptable for ingestion. As another example, a telephone number may be present and believed to be a personal number. In such an example, an analysis can perform a search to determine whether the number is personal or that of an entity (e.g., a government entity, a business entity, etc.) to check or suggest a property value. As an example, a method may analyze data to quality control one or more existing legal tags and to indicate where one or more changes may be appropriate. In such an example, a GUI may be rendered to a display that can allow for review and adoption of one or more of the changes, which may be accompanied by one or more suggestions.

As to resolving a conflict, a method may include revising a legal tag property value and/or revising data, which may include editing, deleting, etc., of data. As an example, where a legal tag property value indicates that data do not include personally identifiable data and an analysis of the data indicates that the data do include personally identifiable data, a conflict may be raised and resolved, for example, by altering the legal tag property value (e.g., to indicate that one or more types of personally identifiable data are acceptable) or by deleting the personally identifiable data. In such an example, the storage block 922 can store the altered legal tag property value and/or store the data as revised by deletion of the personally identifiable data. While deletion is mentioned, a method may include redaction, obscuring, etc., of personally identifiable data, which may be performed in a manner that is irreversible in the stored data of the storage block 922 (e.g., to comply with one or more regulations, etc., as represented by a legal tag, etc.).

As an example, a method may operate in a background mode. For example, a legal tag method may operate in a background mode that can provide for notices in response to one or more changes. For example, consider a change in a regulation. In such an example, a method can issue a notice to one or more users of a system where the notice indicates that a restriction or prohibition no longer exists, that a new restriction or prohibition is in place, etc. In such an example, a project may be automatically halted by a system such as the system 800 such that a re-analysis can be performed by one or more legal tag computational components. Where such a re-analysis returns a result that may prohibit use of certain data, the project may become locked or otherwise inaccessible to a user.

As an example, a system can include one or more components that utilize one or more application programming interfaces (APIs) for accessing regulatory information. As an example, a system can include one or more components that can access the US Federal Register and that can scan information therein to determine whether a change in a regulation may have occurred. In such an example, the system can update one or more features to account for a change and/or issue one or more notices to one or more system users for notification of the change.

In FIG. 9, the method 900 is shown as including various computer-readable storage medium (CRM) blocks 915, 919, 923 and 927 that can include processor-executable instructions that can instruct a computing system, which can be a control system, to perform one or more of the actions described with respect to the method 900. In FIG. 9, the method 930 is shown as including various computer-readable storage medium (CRM) blocks 935, 939, 943 and 946 that can include processor-executable instructions that can instruct a computing system, which can be a control system, to perform one or more of the actions described with respect to the method 930.

As shown in the example of FIG. 9, a system 990 can include one or more computers 992 that include one or more processors 993, memory 994 operatively coupled to at least one of the one or more processors 993, instructions 996 that can be, for example, stored in the memory 994, and one or more interfaces 995. As an example, the system 990 can include one or more processor-readable media that include processor-executable instructions executable by at least one of the one or more processors 993 to cause the system 990 to perform actions such as, for example, one or more actions of the method 900 and/or one or more actions of the method 930. As an example, the instructions 996 can include instructions of one or more of the CRM blocks 915, 919, 923, 927, 935, 939, 943 and 947. The memory 994 can be or include the one or more processor-readable media where the processor-executable instructions can be or include instructions. As an example, a processor-readable medium can be a computer-readable storage medium that is non-transitory that is not a signal and that is not a carrier wave.

As explained, data can be regulated by regulations, protected by regulations, etc. Regulations can be specified by a government, a non-governmental corporate entity, a standards entity, etc.

Various data may be available publicly whereas other data may be available privately, which may be subject to regulations. In the United States, data can be available publicly through one or more entities, which can be corporate entities (e.g., corporations, non-governmental entities, etc.) or governmental entities. As an example, consider data such as the data in Table 1 below, which is available from the USGS, where latitude and longitude have been truncated to two digits after the decimal point.

TABLE 1

Example of publicly available well data.

| Quad | ID | Well Name | Number | Operator | Lat. | Long. | TD | Year |
|---|---|---|---|---|---|---|---|---|
| 171 | 00007 | Galahad 1 | OCS Y-1092 | Amoco Prod. | 70.56 | −144.95 | 9238 | 1991 |
| 223 | 20018 | Gyr | 1 | Arco Alaska | 69.65 | −147.27 | 8020 | 1990 |
| 171 | 00001 | Hammerhead 1 | OCS Y-0849 | Union Oil of CA | 70.36 | −146.02 | 8034 | 1985 |
| 171 | 00006 | Hammerhead 2 | OCS Y-0849 | Union Oil of CA | 70.37 | −146.03 | 6460 | 1986 |
| 179 | 20001 | Kavik | 1 | Pan American | 69.63 | −146.56 | 9564 | 1969 |
| 179 | 20003 | Kavik Unit | 2 | Arco O & G | 69.63 | −146.65 | 7500 | 1973 |

Table 1 provides latitude, longitude, and total depth (TD) of wells in areas adjacent to ANWR in Alaska. API well number is given in the first two columns without the State of Alaska prefix, which is 50. For example, the API number of Alaska Island 1 is 50-089-20018. The year in which drilling was completed is given in last column. In such an example, a method can include accessing publicly available data where information such as latitude and longitude exists that can be utilized to determine, check, etc., location information in data being accessed as in the method 900, the method 930, etc.

Additional data can include, for example:

Hammerhead 1 5442-5490 DST#1 thru perfs. Multiple flow and shut in intervals. Ran nitrogen cushion. Rec. gas to surface in 25 min, too small to measure; oil (20 deg API) to surface in 70 min at 31 bbl/hr. ISIP 2300, FSIP2313, IHP 2474, FHP 2501 psi.

Hammerhead 1 5300-5315 DST#2 and DST#2B thru perfs. Multiple flow and shut in intervals. Nitrogen cushion. Gas to surface in 3 hr at 182 MCFD; oil to surface in 3.2 hr at 38 bbl/hr. ISIP 2339, FSIP 2338 psi. Extrapolated pressure at 5210 ft ranges from 2319 to 2350 psi.

West Kavik 1 6225-6260 DST#6 thru perfs. 5 min initial flow, 45 min shut in, 10 hr flow, 3 hr shut in. Strong blow for 9 hr decreasing to a moderate blow for last hour. Rec. water cushion, 650' mud, 3556' of muddy to clear water. No oil or gas shows. ISIP 2500, FSIP 2450, IHP 2744, FHP 2720 psi.

Yet additional data may include, for example:

Offset: Vertical offset at total depth=TVDSS−(MD−KB), in feet, where TVDSS is true vertical depth sub-sea, MD is measured depth, KB is Kelly Bushing elevation. This value increases with well deviation. non=no deviation.

2way: Two-way travel time (TT) computed from sonic log.

M.W.: Mud Weight, from USGS list (Mmp), mud log (Mml), well history (Mwh). Dip: Dipmeter, conductivity traces from 4 arms (Dip4), tadpole plot showing strike and dip(DipTd).

Show: Oil and gas shows from American Stratigraphic Co. (ShA), from mud log (ShM), and from Amoco strip log(ShS).

Tops: Stratigraphic tops from Bird (1982, 1986) (Tkb); from well history (Twh).

FTA: Fission track age (fta)

The foregoing data of the USGS provides examples of types of data that may exist for wells and that may be relevant to a workflow that can be performed using a system such as the system 800 of FIG. 8.

As an example of another source of data, consider the State of Texas and the Railroad Commission of Texas (RCT), which has regulations as to production for wells and a production data query system (PDQ) for wells. The PDQ maintains production data as reported by each oil and gas lease rather than by individual well. For example, in the case of an oil lease, reported monthly production includes production from the wells on the lease, and a single oil lease might include numerous oil wells; whereas, gas leases have one gas well per lease. Under the RCT regulatory framework, production reports are due from operators on the last day of the month for the previous month. For example, at the end of August, July production reports are due. For this reason, there is a two-month lag time for online production information. Production information reported by the RCT is taken directly from the reports submitted to the RCT by operators. Production reports reflect a snapshot in time. For this reason, production information may change and be updated as the RCT receives revised, adjusted and/or delinquent production reports from operators. Historically, production records tend to be substantially complete after about six months.

The RCT framework can associate an API number of a well with a lease name along with other information, including the lease number. With the lease number, it is possible to access the PDQ to obtain production data. Such data can be "public" and accessible to those that can access the PDQ website via the Internet.

At another level of government, the federal level, the United States government maintains information through the Energy Information Administration (US-EIA). The US-EIA maintains application programming interfaces (APIs) for various datasets, including hourly electricity operating data, including actual and forecast demand, net generation, and the power flowing between electric systems; 408,000 electricity series organized into 29,000 categories; 30,000 State Energy Data System series organized into 600 categories; 115,052 petroleum series and associated categories; 34,790 U.S. crude imports series and associated categories; 11,989 natural gas series and associated categories; 132,331 coal series and associated categories; 3,872 Short-Term Energy Outlook series and associated categories; 368,466 Annual Energy Outlook series and associated categories; and 92,836 International energy series.

As to petroleum, the US-EIA has indicated that its production figures are production estimates. Consider data such as domestic production data for the State of Alaska and the lower 48 states given in terms of thousands of barrels per day (e.g., Alaska, 484; Lower 48, 11,600). Such data can be available in a disaggregated form, however, they may not be available on a well-by-well basis. As mentioned, the RCT PDQ data are on a lease basis such that for a multi-well lease, the production of a given well may not be discernable from production data on a lease basis. As an example, in some circumstances, production data for an individual well on a multi-well lease may be private (e.g., proprietary, confidential, secret, etc.).

The foregoing example demonstrates that it can be at times difficult to discern whether data are private or public. Further, an individual may be unaware of regulations and/or conditions that may make data private or public. And, for example, an individual may be unauthorized to access and/or view certain data, which can depend on various circumstances. For example, nationality or nationalities of an individual may be germane, age may be germane, location may be germane, travel plans to regions of the world may be germane, corporate employment may be germane, past employment may be germane, type of operating system of a computing device or system and/or status of the operating system may be germane, type of computing device or system may be germane (e.g., country of manufacture, country of manufacturer, etc.), etc.

As to computing equipment and/or associated technologies (e.g., software, etc.), various conditions can be subject to regulation. For example, a national government of one nation may ban via regulation the use of communication equipment and software made by a company that is based in a different nation. Such a ban may be premised on security issues such as access to data being communicated, access to data being stored, access to metadata about transmissions, etc. Such regulations can be dynamic in that they can appear without little notice and/or be non-written and imposed by "diplomatic" pressure. Other aspects may involve contractual negotiations where a supplier is selected to provide specific equipment and/or services. For example, a corporate entity and/or a government entity may be under contract to utilize a specific operating system, a specific Web browser, a specific trusted platform module (TPM), etc. Such factors can, when not met, indicate that some type of data governance issue may exist. Consider employee Y of corporate entity Z1, which uses computers with OS X. Where employee Y attempts to work with data of corporate entity Z2, that data may expect employee Y's computer to be using OS X. If that condition is not met, then employee Y's computer may be prohibited from accessing that data.

As an example, a system can include one or more interfaces that can access data that can be regulated data and/or data acquired by regulations. For example, the PDQ includes production data per regulations where the data can be public; whereas, a corporate database can include data that is regulated by the corporation where the data are private. As an example, data can be compliance data that can be utilized to comply with one or more regulations, whether to be reported and/or to be reportable upon request (e.g., from an authorized entity). For example, a corporation may receive a demand or inquiry from an authorized entity to access certain data, in such a scenario, the data can be conditionally accessed for a specific purpose (e.g., to comply with a regulation, etc.).

As to data in the oil and gas industry, consider an export control classification number (ECCN) where the US government considers, for purposes of one or more regulations (e.g., a law, rule, regulation, etc.), that oil and gas exploration data are treated as a commodity, not software or technology, where de minimis procedures for commodities may apply. Yet, regardless of whether the data being processed are subject to the Export Administration Regulations (EAR), providing such a service by a US person for such end uses in a listed country may likely be prohibited by the Office of Foreign Assets Control (OFAC). The OFAC of the US Department of the Treasury administers and enforces economic and trade sanctions based on US foreign policy and national security goals against targeted foreign countries and regimes, terrorists, international narcotics traffickers, those engaged in activities related to the proliferation of weapons of mass destruction, and other threats to the national security, foreign policy or economy of the United States. OFAC acts under Presidential national emergency powers, as well as authority granted by specific legislation, to impose controls on transactions and freeze assets under US jurisdiction. Sanctions can be based on United Nations and other international mandates, be multilateral in scope, and involve close cooperation with allied governments.

A legal tag can be generated using a system that can determine and/or facilitate determining whether data are subject to an export license from the US Department of Commerce. Such a system can determine whether "export" of one or more data items is to occur or may occur through use of one or more computational frameworks. Such a system can include accessing a database that includes Export Control Classification Numbers (ECCNs). ECCNs are five character alpha-numeric designations used on the US Commerce Control List (CCL) to identify dual-use items for export control purposes. An ECCN categorizes items based on the nature of the product, particularly, type of commodity, software, or technology and its respective technical parameters.

An ECCN is different from a Schedule B number, which is used by the US Bureau of Census to collect trade statistics. An ECCN is also different from the Harmonized Tariff System Nomenclature, which is used to determine import duties.

ECCNs are listed in the US Commerce Control List (CCL) (Supplement No. 1 to Part 774 of the EAR), which is divided into ten broad categories, and each category is further subdivided into five product groups. The first character of the ECCN identifies the broader category to which it belongs and the second character identifies the product group.

US Commerce Control List Categories:
0=Nuclear materials, facilities and equipment (and miscellaneous items)
1=Materials, Chemicals, Microorganisms and Toxins
2=Materials Processing
3=Electronics
4=Computers
5=Telecommunications and Information Security
6=Sensors and Lasers
7=Navigation and Avionics
8=Marine
9=Propulsion Systems, Space Vehicles, and Related Equipment
Five Product Groups
A. Systems, Equipment and Components
B. Test, Inspection and Production Equipment
C. Material
D. Software
E. Technology For example, an ECCN beginning with "3A" is for electronics systems, equipment and components; whereas, "6D" is for sensors and lasers software.

As an example, a system can access data, for example, as a data file, and determine aspects of that data and/or data file that can facilitate determining a ECCN. For example, where "software" or software-related terminology are present, a product group "D" classification may be made or suggested. As an example, consider a corporation such as Microsoft Corporation being mentioned in a data file and/or a trademark of a product thereof (e.g., AZURE, EXCEL, etc.), which can indicate that software is involved.

As an example, where one or more of a particular tool (e.g., sensor, etc.), type of measurement, etc., is mentioned in a data file, that data can be utilized to discern a possible ECCN. For example, consider "GR" appearing in a file, which can infer gamma ray data as acquired by a gamma ray tool. Gamma ray tools may be utilized to record naturally occurring gamma rays in a formation adjacent to a wellbore. Such a measurement can be considered to be a "nuclear measurement", which indicates the radioactive content of a formation. In the foregoing example, the term "nuclear" may also appear in the data file. As such, the US CCL category "0" may be suggested as a possible match ("nuclear materials, facilities, and equipment"). However, with the presence of GR (e.g., or gamma ray), a system can determine that US CCL category "0" is not likely to be involved.

In some instances, an item may not fall under the jurisdiction of the US Department of Commerce and not be listed on the US CCL. In such an instance, the item may be designated as EAR99. Various commercial products are designated EAR99 and tend to be exportable or re-exportable without a license. However, as mentioned, other provisions may apply. For example, where export of an EAR99 item may occur to an embargoed or sanctioned country, to a party of concern, or in support of a prohibited end-use, such an item may demand a license or may not be exportable (e.g., or re-exportable).

The US regulatory framework is complex. In a global environment, additional regulatory frameworks can apply, which further increase complexity.

As various data, services, etc., can be provided via the Internet, in some instances, Internet Protocol (IP) based geolocating can be utilized; however, such an approach to geolocating does not provide 100 percent accuracy. As an example, IP-based geolocating may utilize information such as an IP address and/or a MAC address.

An IP address is a numerical label assigned to each device connected to a computer network that uses an Internet Protocol (IP) for communication. An IP address serves two principal functions: host or network interface identification and location addressing. IP version 4 (IPv4) defines an IP address as a 32-bit number. However, because of the growth of the Internet and the depletion of available IPv4 addresses, a new version of IP (IPv6), using 128 bits for the IP address can be utilized.

A MAC address is a media access control address of a device that is a unique identifier assigned to a network interface controller (N IC). For communications within a network segment, a MAC address can be used as a network address for most IEEE 802 network technologies, including Ethernet, Wi-Fi, and BLUETOOTH. Within the Open Systems Interconnection (OSI) model, MAC addresses can be used in the medium access control protocol sublayer of the data link layer. MAC addresses can be recognizable as six groups of two hexadecimal digits, separated by hyphens, colons, or no separator.

As an example, a data file, data therein and/or metadata associated with a data file may include information such as an IP address and/or a MAC address, which can be utilized to estimate a real-world geographic location of an Internet-connected computing device (e.g., fixed or mobile) that may have generated data, generated the data file, transmitted and/or received the data file, etc. Geolocation can involve mapping an IP address to a country, a region (e.g., city, etc.), latitude/longitude, an Internet Service Provider (ISP), a domain name, etc.

Accuracy of geolocation database varies depending approach. For example, one or more databases may be utilized for geolocation where an IP-to-country database may offer approximately 95 percent or more accuracy as to country and more specific location accuracy in a range anywhere from approximately 50 percent to approximately 75 percent. As such, geolocation using IP approaches can be relatively accurate as to country. However, where accuracy beyond approximately 95 percent is desired, one or more additional techniques can be utilized (e.g., API well number, lease information, corporate information, individual information, network trace information, date/time information, etc.). As an example, consider a well that commenced production in 2009, where an IP-based geolocation places that well in country Y using a IP address for a transmission dated 2002, that geolocation may be in error. In response to a data conflict, a hierarchical approach that aims to provide greater certainty may turn to other indicia of location (e.g., phone numbers, other sources of data for the well, etc.).

As mentioned, one or more application programming interfaces (APIs) may be utilized by one or more components of a system. For example, consider the API referred to as Federal Register 2.0 API ("FR API"), which builds on the OFR/GPO bulk XML data feed. The FR API is for data accessible via FederalRegister.gov and can be used to fetch information about agencies, particular articles, or use of advanced search functionality to programmatically find articles, etc. The FR API provides various features for implementations using various platforms, such as, for example, an API client RUBY gem for the RUBY language developers. Data available include data from the GPO MODS (metadata) files and the GPO bulk data files. The FR API uses JSON as a lighter-weight, more web-friendly data transfer format. The API is fully RESTful; URLs are provided to navigate to the full details or to the next page of results (Hypermedia As The Engine Of Application State, HATEOAS). A JSONP interface is enabled, for example, a user may add a "callback=foo" CGI parameter to the end of a URL to have the results be ready for cross-domain JAVASCRIPT consumption. As to endpoints, these include information about the agencies in the FederalRegister.gov database, located at http://api.federalregister.gov/v1/agencies.json; metadata and details about a particular Federal Register document, located at http://api.federalreigster.gov/v1/articles/[DOCUMENT_NUMBER].json; and full search capabilities, matching the functionality of advanced search. As to search functionality, supported features include keyword: "conditions[term]=fishing"; including some advanced query capabilities such as:

Publication date (publication_date) and legal effective date (effective_date):
Exact match: conditions[publication_date][is]=10/15/2011; Year: conditions[publication_date][year]=2011; Less than or equal to: conditions[publication_date][lte]=10/15/2011; and Greater than or equal to: conditions[publication_date][gte]=10/15/2010;
Publishing agencies include one of (use the agency ID from the /v1/agencies.json endpoint):
conditions[agency_ids][]=17&conditions[agency_ids][]=18;
Document category: conditions[type]=PRORULE; possible values are RULE, PRORULE, NOTICE, PRESDOCU;
Agency docket number: conditions[docket_id]=EPA-HQ-OPPT-2005-0049;
Article significance under EO 12866: conditions[significant]=1;
Affected CFR parts: conditions[cfr][title]=40&conditions[cfr][part]=745; and Locations mentioned:
conditions[near][location]=94117&conditions[near]
[within]=25, where "within" is specified in miles.

As indicated above, searches can be particular to various types of data, various types of regulations, etc. For example, locations can be utilized along with a proximity criterion. Where a project pertains to a well at a particular location and data from another location, a system can include using such locations as a basis for one or more location searches using the FR API.

As an example of Federal Register data, consider the following excerpt:

Revision to ECCN 7A005

This correction rule amends the License Requirements section of ECCN 7A005. The first amendment removes the text "These items are "subject to the ITAR" (see 22 CFR parts 120 through 130)." and adds in its place "Reason for Control: NS, MT and AT". The second amendment adds a License Requirements table to indicate a license requirement for national security (NS) reasons for the export or reexport of items listed in ECCN 7A005.b to all countries that have an "X" in NS Column 1 on the Commerce Country Chart (see Supplement No. 1 to part 738 of the EAR), i.e., all countries, except Canada.

As indicated above, the ECCN is "7A005", which is for "7=Navigation and Avionics" and "A. Systems, Equipment and Components". As an example, a project that involves a marine seismic survey, drones, etc., may trigger a hit using a FR API based search. The results can be analyzed (e.g., as to countries, etc.) to determine whether there may be an impact on a particular project, project data, acquisition of data, etc. While the foregoing example pertains to an "A" product group, an associated "D" (e.g., software) product group may be found in an FR API search. In various examples, equipment and/or software regulations may carry over to data that are produced via such regulated equipment and/or software.

Complexities of data governance in the cloud digital space in a global environment, from a legal compliance perspective (e.g., data residency, TCC, etc.), from a business compliance perspective (e.g., contract expiration, data-usage/right of use, etc.), etc., can benefit from use of tags (e.g., "legal tags").

Often, end users can lack an awareness of data governance, legal compliance, business compliance, etc. Often, users want access to data when and where desired, without experiencing a personal overhead, such as filling out a legal tag compliance form each time data are ingested into a system, particularly where a legal tag could potentially be different for each dataset, each document, each set of documents, or individual records within a dataset to be ingested.

As an example, a data governance framework can leverage one or more of a variety of techniques, algorithms, and technologies to "predict" an appropriate legal tag to be applied to particular data. Such a framework may operate in an automated and/or semi-automated manner that can allow for stricter compliance with regulations with minimal interference with a user's workflow. Such an approach can at least in part automatically "navigate" regulatory environments, which can be dynamic and complex in the realm of legal and/or business compliance.

Figure 10:
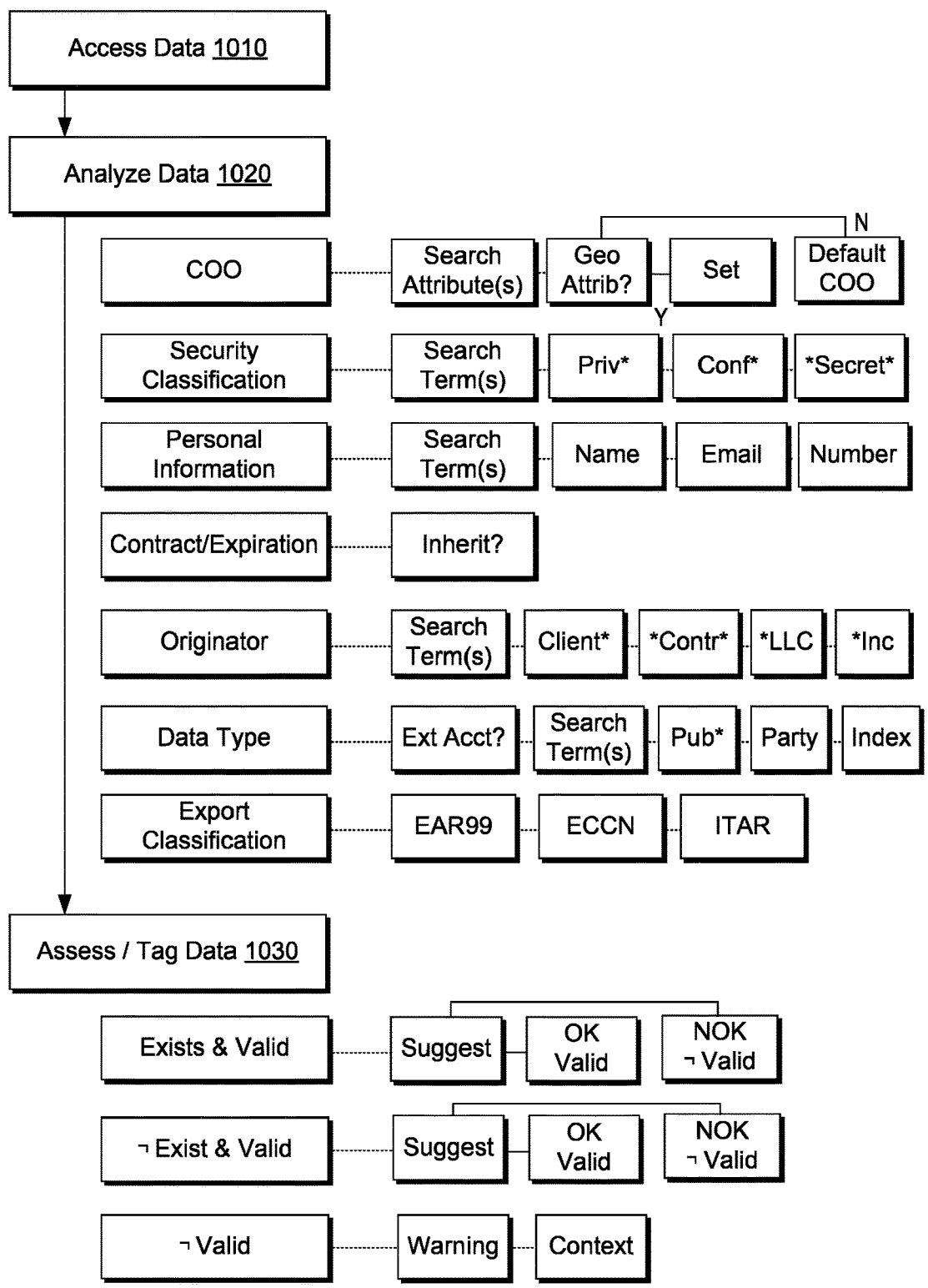
FIG. 10 illustrates an example of system components and an example of a method.

FIG. 10 shows an example of system components 1000 as may be associated with an example method 1001, which includes an access block 1010 for accessing data, an analysis block 1020 for analyzing data and an assessment and/or tag block 1030 for assessing one or more tags and/or tagging data.

The access block 1010 can provide for accessing one or more data files or other data structures. Such accessing can include network communications, which may provide for IP and/or MAC addresses, traces, etc. As an example, data may be acquired through operation of the access block 1010 where at least a portion of that data may be analyzed. For example, consider the analysis block 1020 being capable of performing analyses of data accessed by the access block 1010 and data that may be generated through operations of the access block 1010 (e.g., network transcripts, network log files, authentication transcripts, etc.). In such an example, the analysis block 1020 may be provided with indicia that can supplement the accessed data. For example, consider a data file that resides on a server in Norway where the access block 1010 accesses the data file via an IP-based process that generates metadata for the process. That metadata can include IP addresses that can be subject to analysis by the analysis block 1020 for purposes of geolocation (e.g., determination of country of origin (COO), etc.). Accordingly, the method 1001 can through its own actions generate additional data (e.g., a network trace with time stamps, etc.) and/or "discover" additional data (e.g., an IP address, a MAC address, etc.). As an example, where data or data files are within a cloud-based platform, the cloud-based platform may provide additional data (e.g., who or what uploaded that data, data file, etc., to the cloud).

As shown in the example of FIG. 10, the analysis block 1020 can implement various components, which can include a country of origin (COO) component, a security classification component, a personal information component, a contract/expiration component, an originator component, a data type component and an export classification component.

As shown, the COO component can include searching for one or more attributes, which may uncover a geo-attribute with some amount of geographically relevant data. In such an example, where uncovered, the COO may be set; otherwise, a default COO (e.g., US, unknown, etc.) may be utilized.

As shown, the security classification component can include searching for one or more terms, optionally via prefix or other portion thereof, which may be performed using multiple spoken languages. In such an approach, the analysis block 1020 can determine whether data accessed include data subject to an indicated level of security (e.g., a corporate entity indication as to security).

As to the personal information component, it can include features that can search for one or more terms, data structures, etc. For example, consider a name database that can be called upon to perform a name search. Such an approach can include accessing a corporation employee database, etc., which may include a listing of names. As an example, a format may be utilized to identify a name as data. A format may be an abbreviated first name such as a first initial followed by a period and another term, which may be a last name (e.g., J. Smith, etc.). As shown, an email may be found using one or more search techniques. For example, consider searching for a *.com or similar domain indicia. Where a listing of corporations or other entities is known a priori, that listing may be utilized. For example, consider a listing that includes "slb" for a corporate entity "Schlumberger" (e.g., @slb.com). As to number, such a number may be a telephone number, which may include a country code.

As to the personal information component, a search and results thereof can serve one or more purposes. For example, consider geolocation as a purpose to confirm a COO and/or where data may be potentially "exported" and/or "re-exported". As another example, consider the General Data Protection Regulation (GDPR) 2016/679, which is a regulation in European Union law on data protection and privacy for individuals (e.g., of the European Union and the European Economic Area), which addresses the export of personal data (e.g., outside the EU and EEA areas). In such an example, the operation of the analysis block 1020 via the personal information component may mark personal information (e.g., personal data) for deletion, obscuring, etc. For example, a person's name can be deleted to thereby obscure that person's identity in association with a telephone number of a corporation. Further, the telephone number may be truncated, for example, to retain a country code and a prefix that is associated with a corporate entity but not a specific employee (e.g., consider truncation that deletes an extension of the last digit or last few digits). In such an approach, the analyzed data can be brought into compliance with GDPR provisions (e.g., not saving personal data) while still maintaining sufficient integrity to determine (e.g., forensically, etc.) how determinations were made with respect to legal tags.

To make a system efficient as to data governance, one or more components can leverage data accessed and, as appropriate, delete unnecessary data such that data governance issues that may exist for a data store do not exist for the system. For example, the system can help to assure that GDPR types of issues that may exist for a data store do not carry over to the system. Such an approach may involve "depersonalizing" data (e.g., making it free of personal identifiers) and/or "corporatizing" data (e.g., making it strictly adhere to a corporate entity or entities).

As shown, the contract/expiration block can optionally inherit contract data, which can include, for example, expiration data. In such an example, the expiration data can be a date for expiration of a contract where the contract involves utilization of a system such as the system 800 of FIG. 8. In such an example, the analysis block 1020 can determine a date that can be relevant to tagging data with one or more types of legal tags. For example, consider data to be tagged with a legal, contractual retention tag such that the data are deleted (e.g., erased) from the system at the appropriate time (e.g., end of contract date, data specified in contract, data according to one or more laws, etc.). As an example, where a date exists, a term in a contract may specify a period of time for data retention (e.g., three years). In such an example, data can be tagged for deletion at three years post-contract expiration. As another example, consider data analyzed to be found in association with the term "confidential". In such an example, a contract can include a clause that specifies that the "confidentiality" of the data is time dependent. For example, the data may no longer be considered to be confidential after four years. In such an example, the analysis block 1020 may provide an indication for tagging with a time dependent tag that adjusts a "confidentiality" status after four years. In such an example, a tag may provide for storing the data in a public or other type of data pool where it may be accessed for one or more purposes. For example, consider data for a well that is to be shut in within a one year period where the data are to no longer be confidential three years after shut in. Such data may be useful for one or more workflows performed using a system such as the system 800 and may be marked as being accessible once the time period has run (e.g., after four years, data are accessible).

As shown, the originator component can perform one or more searches using terms, portions of terms, etc., which may include entity types of terms for entities according to laws of one or more countries. For example, as to Germany the terms such as "AG" or "GmbH" may be searched and, as to the US, terms such as "LLC" and "Inc" may be searched. As indicated in FIG. 10, the originator component can include additional types of searches such as "client" or "contr". As to the latter, it may uncover phrases such as "drilling contractor" or "wireline contractor" or "contractor for water pumps", etc.

As shown, the data type component can include features to determine whether an account is internal or external to a system, a cloud-platform, etc. As shown, the data type component can include search features, which may search for terms such as "pub*" to find "public" as to data type. Such a search may provide results that can be analyzed in combination with results of the security classification component (e.g., consider private versus public). As shown, party names such as parties to a contract may be found. As an example, the data type component may include index features, for example, where data may be of an indexical type. For example, data may be indexed according to one or more regulations.

As shown, the export classification component can include various features as may be related to EAR, EAR99, ECCN, and International Traffic in Arms Regulations (ITAR). As an example, a project may involve security equipment such as equipment that can be utilized to help assure personal security of employees, contractors, etc., and/or equipment security of equipment that may be valuable and/or subject to tampering in one or more zones in the world. As mentioned, a system can utilize various types of data to provide for an export classification, which can include one or more classifications as to re-export. As may occur from time to time, a user of a system in one country may aim to collaborate with a user of the system in another country. In such scenarios, import, export, import and re-export may occur where it can be beneficial to tag data such that one or more of those data related operations does not occur with respect to a country that is prohibited by regulation. As an example, a tag can be utilized to prohibit one or more actions such as transmission of data and/or results based at least in part thereon to a computer in a prohibited country.

As an example, a method can include performing various processes in series and/or in parallel to predict legal tag properties and/or assess compliance with one or more legal tag properties. For example, a legal tag can be a data structure that includes properties that can optionally be utilized to control action and/or prohibit action. As mentioned, a property can call for controlling an action such as deletion. As another example, consider controlling an action such as reporting for purposes of compliance. As to prohibition, a system can include transmitting a preliminary message for purposes of determining a network trace where the network trace may reveal IP addresses that can be geolocated. In such an example, the geolocations determined using the IP addresses can be analyzed to determine whether a legal tag property as to a country indicates that transmission of certain data and/or results is prohibited, which can cause a system to prohibit such transmission.

As an example, a system can implement a method that accesses data where the method attempts to detect a country of origin (COO). Where a COO is not detected, the system may set a legal tag property to a default for a COO field. In such a method, the process of accessing data may involve ingesting data. For example, consider ingesting data via the data intake area 730 of the GUI 700 of FIG. 7.

As an example, a method can search for location specific attributes and/or combinations of attributes of data, for example, by leveraging a system data catalog service. A data catalog service can include data pertaining to entities, projects, etc., as may be specified at one or more levels, which can include metadata levels. For example, consider a past project by entity X where geographic attributes are in a data catalog for entity X.

As an example, a COO component can perform a search where, if a geographical attribute is found (e.g., City, State, Province, Prefecture, Country, etc.), the component can provide for setting a COO legal tag property to the country identified based on the geographical location; whereas, if no geographical attribute is found, a default property can be the country of the user of the system (e.g., the user that intends to utilize accessed data for a project, etc.). The country of the user may be known via a computing device that is utilized by the user (e.g., an IP address, a MAC address, etc., that have a known or detectable geographic location).

As to security classification, a security classification component can search for keywords in text and/or metadata of ingested data, an ingested data file, etc., and map one or more security classification legal tag properties accordingly, for example, based on a term frequency count. As an example, a default value may be "Public" and, where the term "private" appears seven times per a frequency count, the default value may be set to "Private". While the example is in the English language; one or more languages may be detected, which can cause appropriate language specific searches (e.g., to achieve an accurate or more accurate result). As to searching, consider utilization of wild card searches, which may include core letters: "Priv*", "Private", "[Company] Private", "Private", etc.; "Confidential", "Conf*", "Confidential", "[Company] Confidential", etc.; "Secret", "Top Secret", "Secret", "[Company] Secret", etc.; etc. As an example, a security classification component may trigger a notification that can terminate a method and/or cause issuance of a notification to an entity (e.g., company, authority, etc.) that certain sensitive data or data file is trying to be ingested to a system. As an example, a system may become locked in response to trigger issued by a security classification component.

As to a personal information component, a default legal tag property value may be "No Personal Data". Such a property may be amenable to being set to a different value. Or, as mentioned, a personal information component may search for and utilized found personal information and then delete it such that the default value of "No Personal Data" is appropriate.

As an example, a personal information component can search for patterns in text and/or metadata of one or more ingested files and map accordingly. For example, consider names where a method can check for combinations of 2, 3, or 4 words which are initial character capitalized that are not in a known gazetteer of geographical locations or business entities (such as company operators). In such an example, where a result or results are found, a value may be set to "PI" (e.g., personally identifiable), which may be temporary depending on whether deletion is to occur. As to email, consider a method that checks for tokens that are separated by the "@" character, and suffixed with one of a common domain (e.g., com, co.uk, co.in, etc.). In such an instance, depending on the characters prior to the "@", a value may be set to "PI". As to a telephone number, consider a method that checks for patterns matching numbers based on a detected COO as from a COO component. For example, if COO is "GB" (e.g., Great Britain, United Kingdom, or UK), then the personal information component may check for number patterns such as: +44 xxxx yyyyyy and/or xxxxx yyyyy. If information is found, a value may be set to "PI". As an example, a personal information component may operate using one or more search terms. For example, consider a search for particular terms in the text and/or metadata of one or more ingested files such that words with meanings such as "Sensitive Personal Information" are found. Such a search can optionally utilize a a dictionary of terms, which can include terms for one or more sensitive areas (e.g., religion, politics, and medical). As an example, where sensitive personal information is found, a legal tag property may be set to "SPI". In such an example, a notice may be issued to indicate that a SPI value has been set. The notice may allow a user to cause deletion of such information, for example, where personal information is not already set to be deleted. As an example, where a value is set to SPI, the system can prohibit rendering of such information to a display. For example, the system can effectively redact the information.

As an example, a system can include one or more components that can perform object recognition for images. For example, consider performing recognition on images for people where it may be assumed that a person can be identified in the image and therefore is to be redacted or otherwise obscured. Such an approach may apply to one or more other types of personally identifiable information, which may include determining whether such information is corporate or personal. For example, consider a license plate on a vehicle where a determination is made that the plate is for a corporation vehicle and therefore can remain; whereas, for a personal vehicle, it may be redacted or obscured. As an example, satellite imagery may be processed similarly as to ground observable features that do not pertain to a wellsite, a surface network, a production site, etc. Such imagery may be subject to regulation where a country prohibits private imagery (e.g., satellite, drone, aircraft, etc.) from being available to show private property of individuals and/or individuals on their private property.

As an example, upon upload of image data, a system (e.g., via a legal tag framework, etc.) can include performing image recognition to determine whether features in the image data may be subject to regulation. As an example, where image data is geo-tagged or can be geo-identified, coordinates of an area or areas may be determined (e.g., via latitude and longitude, etc.) to control redaction, obscuring, cropping, etc. As an example, where image data are geo-tagged (e.g., consider GPS geotagging, IP address "geotagging", etc.), such geographic information may be utilized for one or more purposes (e.g., country of data, country of equipment, etc.). As an example, where image data are time stamped, a time may be utilized for one or more purposes (e.g., age of data and confidentiality thereof, age of data and deletion/accessibility thereof, etc.).

As an example, where data include voice data, a system can include one or more components that can translate the voice data (e.g., audio data) into text. Such an approach can aim to "delete" personally identifiable data such as a person's voice. Once in text form, the data can be further analyzed as to one or more other forms of data, which may include other personally identifiable data of the speaker, speakers, people referenced by a speaker, etc.

As an example, a system can include one or more components that can extract information from data while making the date itself "clean" for purposes of one or more regulations (e.g., GDPR, etc.). For example, data once "clean" may be relatively compliant with one or more regulations, which can facilitate governance of the data (e.g., responses to requests from individuals or other entities under prevailing regulations, etc.).

As an example, a contract and/or expiration component can, by default, inherit a current contract and/or expiration of a user's contract with a system such as the system 800 of FIG. 8. For example, a user can possess one or more credentials that allow for logging into the system where such one or more credentials are associated with a contract that allow authorized use of the system per contractual terms. Such terms can include an expiration date, which can be accessed and associated with a project and/or data that are being ingested. Such a date can be utilized as a value in a legal tag property, which can have an effect on one or more other legal tag properties. As mentioned, where data are to be deleted after completion of a project, which may be according to a contractual term, a legal tag property can be utilized to trigger deleting data at a date that is based at least in part on a date and/or condition in a contract.

As an example, an originator component can set a legal tag property value to a default value, which may be altered depending on one or more searches. For example, consider searching data and/or a data file for one or more company names based on data in a data catalog. In such an example, the originator component can perform a search or searches using, for example, "Drilling Contractor", "Operator", "Logging Contractor", etc. Where a company name is found, a check may be made against the data catalog, for example, to confirm. Where a confirmation is not made, the originator component may render one or more company names to a display such that a user can confirm, edit, enter, etc., one or more company names, where one can be set as the originator (e.g., a legal tag property for "originator" having a value set to that company name).

As an example, a data type component can determine whether a user of a system is using an external account as opposed to a system tenant account. Where an external count is found, a legal tag property value can be set to "external account". In such an example, a data type legal tag property value may be set to "client data". For example, an external account may be for a corporate entity that is using its own data. Such a corporate entity, in view of the tenant of the system, may be considered to be a "client".

As an example, a data type component can analyze incoming data and specified parameters. For example, if a source of the data is demarcated in a source reference list as "Public", a legal tag property value for data type can be set to "Public Data". As an example, where a user of a tenant of a system is performing the data analysis (e.g., data intake), a legal tag property value for data type can be set to the name of the tenant (e.g., SLB, etc.).

As an example, a data type component can provide for classification of data type with respect to a reservoir, a well, a formation, etc. Such indications may result in a legal tag property value being set to "client data", depending on the activities of a tenant. For example, a tenant may not be the owner of an asset or have a lease to an asset that includes a reservoir, a well, a formation, etc., such that logical rules can be applied to determine (e.g., infer) that data being ingested are not data of the tenant.

As an example, a data type component can determine via a search, etc., whether a source of data is demarcated in a source reference as "Third Party". In such an example, a legal tag property can be set to a value of "3rd Party". A third party setting may indicate that the data are not client data and not tenant data.

As an example, a data type component can determine a classification as to data. For example, consider production data that are index data such that a legal tag property value is set to "Index Data"; whereas, if such an indication is not found, the legal tag property value may be set to "EHC" to indicate equipment health check data. EHC data may be from tools that make measurements where information is acquired as to various environmental conditions, tool conditions, etc. As such data may be secondary or tertiary to desired measurement values, those types of data may be property of or private to a tool manufacturer, a tool user, etc. As an example, a method can include analyzing data, which may include EHC data to determine how such data is to be tagged or otherwise handled (e.g., deleted, filtered, stored in a special data store, encrypted, etc.).

As an example, an export classification component can utilize a default legal tag property value of export classification "EAR99". In such an example, a search may be performed in data and/or metadata for one or more ECCN and/or FAR values. A result or results of such a search may be utilized to update one or more legal tag property values, for example, in accordance with term frequency. As an example, an export classification component can rank export classification indicia in data and/or metadata. As mentioned, an export classification component can include searching as to categories, etc., to infer an export classification, which may be utilized for setting the value of one or more legal property tags.

As to the assessment and/or tag block 1030, it may provide for assessing one or more existing legal tags and/or tagging at least a portion of the accessed data of the access block 1010. As shown in FIG. 10, the block 1030 can implement one or more types of logic where the logic can be utilized to trigger actions such as rendering a graphical user interface to a display with a notification, a field for review, a field for selection of a value, etc.

As an example, a method can include prediction of legal tag property values via data analysis. In such an example, the method can include searching existing legal tags (e.g., as may be pre-existing for accessed data). Such a method may include utilizing logic such as:
  a. If exists & is valid:
     i. Suggest legal tag, property and/or property value to user for validation
        1. If user validates, then apply legal tag, property and/or property value to ingested data.
        2. If user does not validate, enable them to select a new legal tag, property and/or property value.
  b. If does not exist & is valid:
     i. Suggest legal tag, property and/or property value to user for validation.
        1. If user validates, then create the legal tag, property and/or property value, then apply to ingested data.
        2. If user does not validate, enable them to select a new legal tag, property and/or property value.
  c. If not valid (regardless if tag exists or not):
     i. Issue warning to user that the data may include data that may not be ingested to the system (e.g., consider the DELFI environment, etc.). Render an indication of context on what was found so the user may be guided in taking appropriate action.

In the example of FIG. 10, the method 1001 can include accessing data per the block 1010, analyzing at least a portion of the accessed data per the block 1020 for prediction of property values, and searching existing legal tags as may be associated with the accessed data to determine, using appropriate logic, whether one or more revisions may be made with respect to legal tags to provide for more accurate compliance, a greater extent of compliance, etc., per the assessment and/or tag block 1030. As mentioned, a method may include revisions to data, such as, for example, deleting certain data, preventing upload of certain data (e.g., via a traffic manager, etc.), filtering in or filtering out certain data, etc., where such actions may provide for more accurate compliance, a greater extent of compliance, etc.

Figure 11:
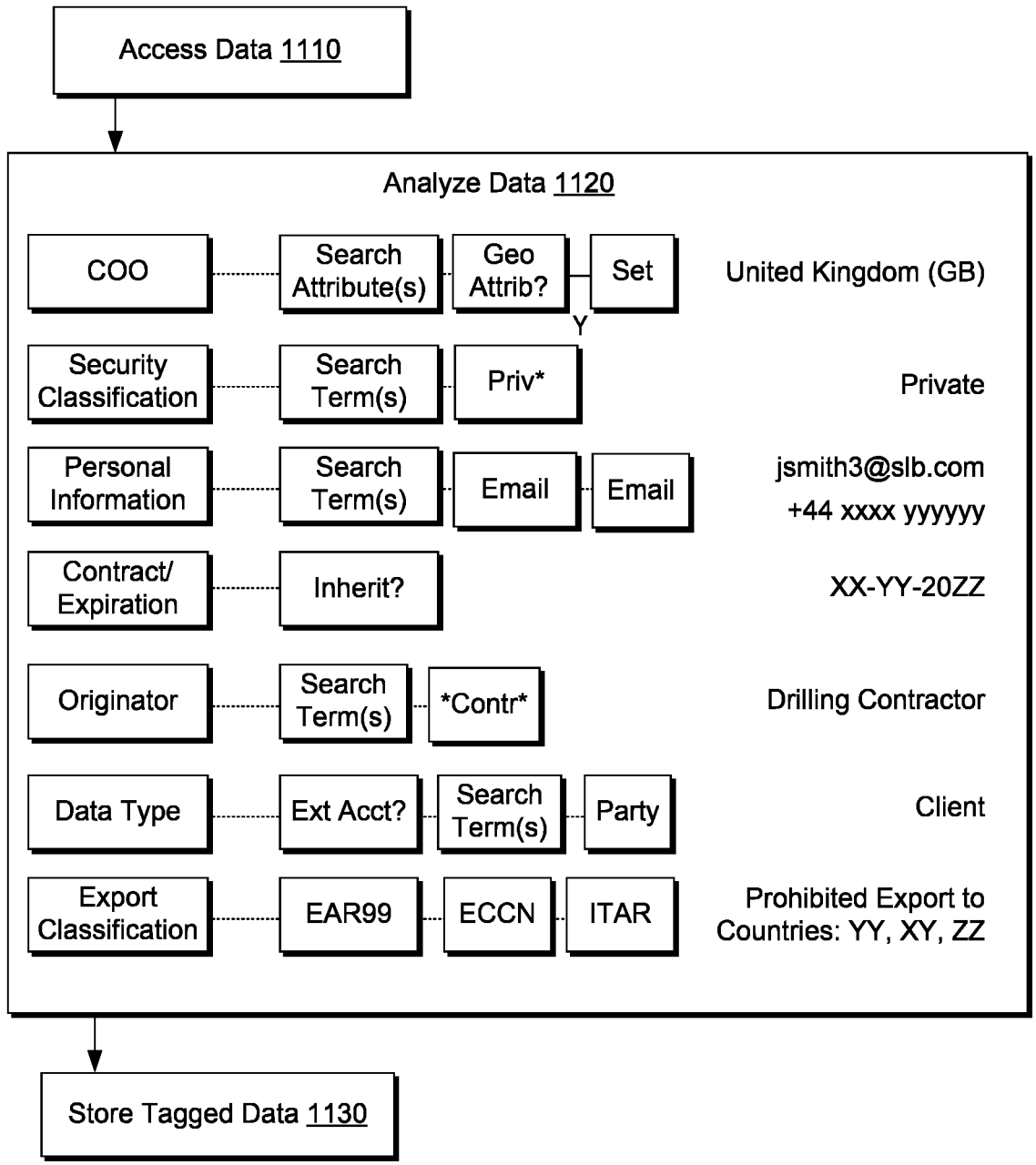
FIG. 11 illustrates an example of a method.

FIG. 11 shows an example of a method 1100 that includes an access block 1110 for accessing data (e.g., tagged data, untagged data, etc.), an analysis block 1120 for analyzing data and a storage block 1130 for storing tagged data (e.g., storing tags in association with data). As shown, the analysis block 1120 provides various examples of indicia that may be uncovered through an analysis of data, one or more data files, data associated with accessing data and/or one or more data files, etc. In the example of FIG. 11, the analysis block 1120 may access one or more legal tag property values, one or more legal tag schema, etc., and/or may determine one or more legal tag property values, generate one or more legal tag schema, etc. As shown in the example of FIG. 11, a country of origin component (COO) can find country of origin data, a security classification component can find private data, a personal information component can find personally identifiable data, a contract and/or expiration component can find a date (or dates or event triggered expiration information, etc.), an originator component can find a drilling contractor, a data type component can find a client, and an export classification component can find data that are prohibited from export to countries YY, XY and ZZ.

As an example, the method 1100 may access publicly available data, which may be utilized to supplement the accessed data of the access block 1110 and/or to assess at least a portion of the accessed data of the access block 1110. For example, consider the data of Table 1, which include well names, IDs, latitude, longitude, etc., which may be matched to accessed data to assess an existing legal tag property value, to generate a new legal tag property value, etc.

The storage block 1130 can be utilized for storing tagged data at least in part according to the analysis block 1120, which may provide for one or more revisions to tags and/or data (e.g., to resolve conflicts, to provide for compliance, etc.). As mentioned, a tag may be an active tag in that it can cause an action to be taken by a system.

As an example, a method can include setting legal tags (e.g., legal tag property values) such that certain data are prohibited from view by a tenant of a system such as the system 800 of FIG. 8 while the data are permissible for use by a client of the tenant.

As an example, a system such as the system 800 of FIG. 8 can include a traffic manager component. For example, consider a component that tags data according to "country uploaded from", "country physically stored", "country originally came from", "country uploaded by someone", "country now stored in", "country modified in", "country distributed to", etc.

As an example, a traffic manager component, system, etc., may be implemented that can operate based on one or more legal tag property values. For example, a traffic manager can check an IP address, an email address, etc., to determine a destination location and/or a transmission route (e.g., with one or more intermediate locations) and to compare a location against one or more legal tag property values to assure compliance with one or more regulations, etc. (e.g., to prohibit transmission to or through one or more countries, etc.).

As an example, one or more rules may be utilized for purposes of data governance. For example, if data were confidential 10 years ago, they may now be public; or, if data are older than 7 years and pertaining to the North Sea, then they may no longer be confidential. Such rules may be implemented as timers, which may be set in accordance with one or more expiration dates, contract dates, subscription dates, tombstone dates, soft delete dates, etc. As an example, a notification component may issue one or more notifications responsive to a change in status of data.

Figure 12:
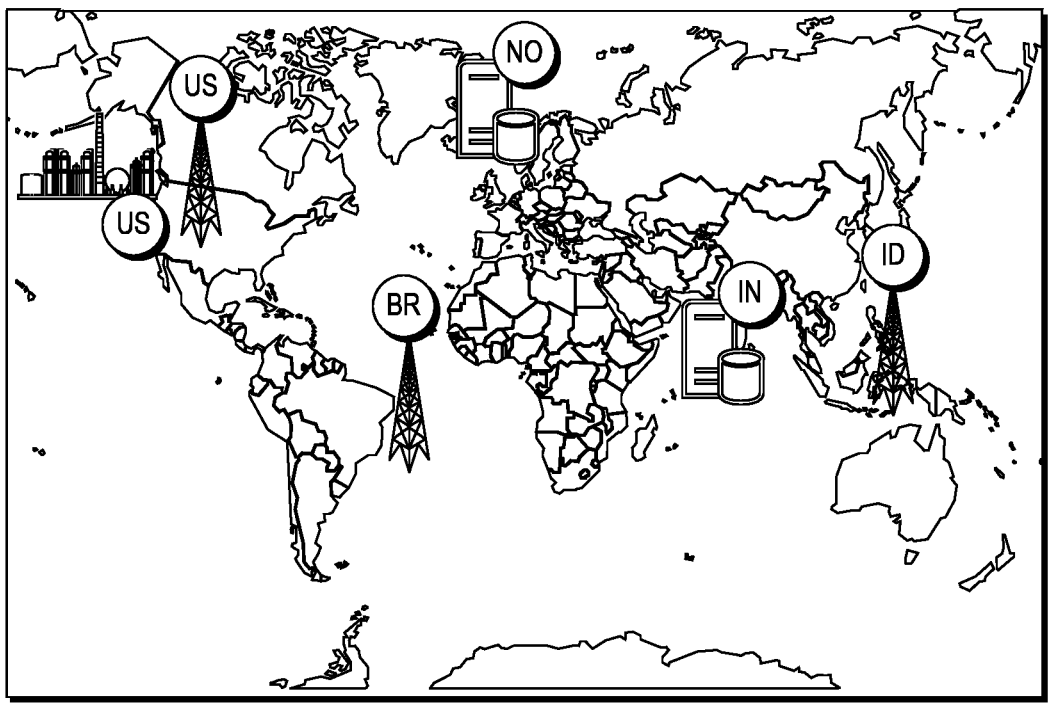
FIG. 12 illustrates an example of a graphical user interface.

FIG. 12 shows an example of a graphical user interface 1200 that can be used to visualize various aspects of data as analyzed by a method such as, for example, an analysis of one or more of the method 900, the method 930, the method 1001, the method 1100, etc. In the example of FIG. 12, a map is rendered such as an international map. As indicated, per example analysis results 1210, wells and/or well data are found in association with countries US, BR and ID; servers, data storage and/or software are found in association with countries NO and IN; and data for a crude oil processing facility is found in association with country US.

The GUI 1200 may provide for interactive visualization of one or more legal tag properties and/or property values (see, e.g., the GUI 850 and the graphical controls 852, 854 and 856). As an example, the international map may indicate one or more countries with prohibitions, for example, according to one or more regulations (e.g., "export controls", etc.). In such an example, a user may optionally add one or more country-based restrictions. For example, a user may click on the map to select a country and cause the country to be added to a restricted list, which can cause an appropriate legal tag to be assigned an appropriate property value. As another example, a user may interact with the GUI 1200 to select countries that are to be utilized for network transmissions. For example, the user may select countries such that network transmissions from one of the objects indicated to another one of the objects indicated occurs through equipment in the selected countries and not in a non-selected country. As an example, the GUI 1200 can include one or more satellites that may be available for secure satellite communication of data, one or more ocean communication fiber networks for secure communication of data, etc. As an example, where a country is not adjacent to a "secure" country, a user may select a satellite network that is secure to assure secure transmissions. As an example, an object (e.g., a well, a vessel, a server, a processing facility, etc.) may be onshore or offshore. The GUI 1200 may provide various features for controlling how objects can transmit data, which can be specified according to one or more legal tag properties (e.g., setting of various property values).

As an example, a method can include accessing data generated during field operations; analyzing at least a portion of the data as to legal tag property values; storing the legal tag property values in association with the data; and operating a computational framework in accordance with the legal tag property values. In such an example, the data can include legal tag property values and, for example, the analyzing can include analyzing at least a portion of the data to assess one or more of the legal tag property values for one or more conflicts. In such an example, the method can include rendering an indicator to a display for at least one of the one or more conflicts, revising at least one of the legal tag property values to resolve at least one of the one or more conflicts and/or assessing by comparing one of the legal tag property values to an automatically generated legal tag property value that is based on the analyzing of the at least a portion of the data.

As an example, a method can include accessing data that are associated with legal tag property values and analyzing at least a portion of the data to assess one or more of the legal tag property values. Such a method can include assessing the one or more of the legal tag property values to identify a conflict and rendering an indicator to a display for the conflict and/or assessing the one or more of the legal tag property values to identify a conflict and revising at least one of the legal tag property values to resolve the conflict, which may occur automatically or responsive to receipt of an instruction, for example, from a graphical user interface that renders information about the conflict to a display (e.g., an indicator of a conflicting entry that is in conflict with information within and/or discerned from accessed data, etc.).

As an example, a method can include accessing data that are associated with legal tag property values and assessing by comparing one of the legal tag property values to an automatically generated legal tag property value that is based on analyzing at least a portion of the data.

As an example, a method can include accessing data that include ingested data as ingested by a data ingestion process that utilizes a specified legal tag schema. For example, a legal tag schema may be selected as part of a data ingestion process, which can be an existing legal tag schema as stored in a data store (see, e.g., the graphical control 854 and the examples of existing legal tag schema for Australia, etc.). While such a legal tag schema may itself be accurate, its ability to properly tag various data without giving rise to one or more conflicts may be limited. As an example, a legal tag schema may be outdated in that it does not reflect one or more changes that may have occurred over a period of time. In such an example, an analysis may include accessing up-to-date information (e.g., via the Federal Register, etc.) to identify one or more conflicts that may be rectified via one or more revisions. As an example, a legal tag schema may be updated (e.g., revised) automatically and/or manually responsive to identification and resolution of one or more conflicts (e.g., as may exist between a current regulation and a prior regulation).

As an example, a method can include accessing well data. As explained, various entities can demand reporting of well data or information derived therefrom. As an example, a method can include generating a report or, for example, issuing a notification that one or more reports can be generated for a particular entity or entities. In such an example, a graphical user interface may render a graphical control that allows a user to select one or more types of reports to generate, which may be for a particular time or period of time.

As an example, a method can include analyzing by utilizing a plurality of different computational components, where one of the computational components searches for personally identifiable data and where another one of the computational components searches for geographically identifiable data. In such an example, the analyzing may identify a conflict as to a legal tag property value that indicates no personally identifiable data exists where personally identifiable data do exist in the accessed data and/or may identify a conflict as to a legal tag property value that indicates data from country X do not exist where data from country X do exist in the accessed data. In such an example, a graphical user interface may be rendered to allow for review of conflicting data and/or conflicting legal tag property values to provide for one or more revisions to data and/or one or more legal tag property values to resolve one or more conflicts.

As an example, a method can include analyzing accessed data by accessing a data catalog associated with a computational framework.

As an example, a method can include operating that accesses stored legal tag property values and prohibits at least one action in accordance with one of the legal tag property values. For example, consider at least one action pertains to transmission of a portion of the data or a result based on at least a portion of the data to a destination in a prohibited country.

As an example, a method can include operating that accesses stored legal tag property values and performs at least one action in accordance with one of the legal tag property values. For example, consider at least one action pertains to deleting at least a portion of the data in accordance with one of the legal tag property values.

As an example, a method can include, responsive to analyzing, deleting personally identifiable data in the at least a portion of the data.

As an example, a method can include rendering at least one result of analyzing to a graphical user interface on a display. For example, a method can include receiving a signal via the graphical user interface that confirms at least one of the at least one result and that causes the storing of a corresponding one of the legal tag property values and/or receiving a signal via the graphical user interface that generates a corresponding one of the legal tag property values. As an example, a signal can correspond to selection of a country that permits or prohibits transmission of data by the computations framework to that country.

As an example, a method can include accessing data that includes client data of a client where a computational framework includes an expiration data for use of the computational framework by the client. For example, consider at least one legal tag property value that depends on the expiration date.

As an example, a method can include analyzing that includes determining a country of origin (COO) of the client where, for example, determining a country of origin (COO) is based on at least a portion of the data and based at least in part on an address associated with transmission of the data via a data transmission network.

As an example, a method can include using legal tag property values that permit use of a portion of data by a computational framework for a project and prohibit use of another portion of the data by the computational framework for the project.

As an example, a system can include a processor; memory accessible to the processor; processor-executable instructions stored in the memory and executable by the processor to instruct the system to: access data generated during field operations; analyze at least a portion of the data as to legal tag property values; store the legal tag property values in association with the data; and operate a computational framework in accordance with the legal tag property values.

As an example, one or more computer-readable storage media can include computer-executable instructions executable to instruct a computing system to: access data generated during field operations; analyze at least a portion of the data as to legal tag property values; store the legal tag property values in association with the data; and operate a computational framework in accordance with the legal tag property values.

Figure 13:
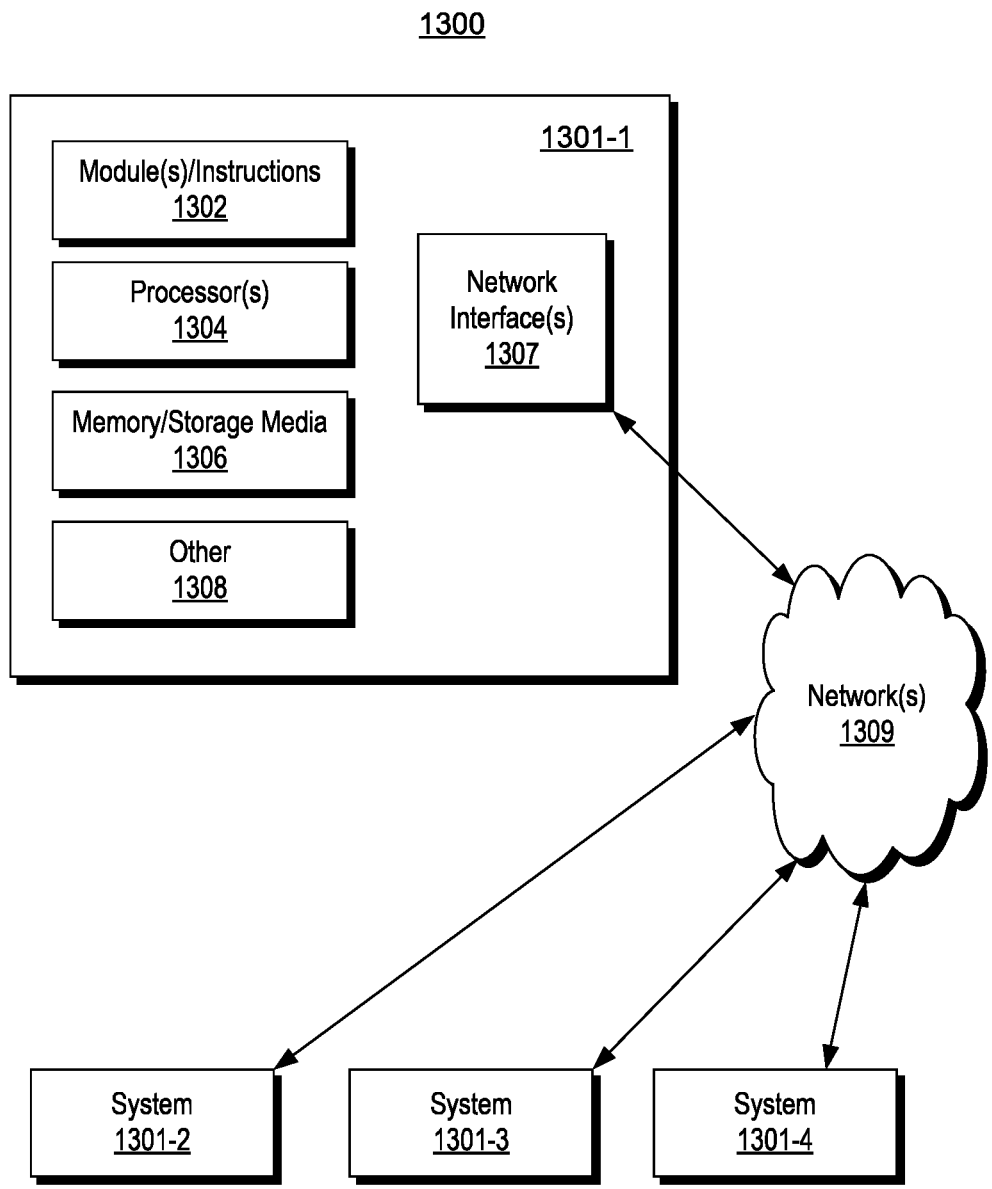
FIG. 13 illustrates examples of computing and networking equipment.

In some embodiments, a method or methods may be executed by a computing system. FIG. 13 shows an example of a system 1300 that can include one or more computing systems 1301-1, 1301-2, 1301-3 and 1301-4, which may be operatively coupled via one or more networks 1309, which may include wired and/or wireless networks.

As an example, a system can include an individual computer system or an arrangement of distributed computer systems. In the example of FIG. 13, the computer system 1301-1 can include one or more modules 1302, which may be or include processor-executable instructions, for example, executable to perform various tasks (e.g., receiving information, requesting information, processing information, simulation, outputting information, etc.).

As an example, a module may be executed independently, or in coordination with, one or more processors 1304, which is (or are) operatively coupled to one or more storage media 1306 (e.g., via wire, wirelessly, etc.). As an example, one or more of the one or more processors 1304 can be operatively coupled to at least one of one or more network interface 1307. In such an example, the computer system 1301-1 can transmit and/or receive information, for example, via the one or more networks 1309 (e.g., consider one or more of the Internet, a private network, a cellular network, a satellite network, etc.).

As an example, the computer system 1301-1 may receive from and/or transmit information to one or more other devices, which may be or include, for example, one or more of the computer systems 1301-2, etc. A device may be located in a physical location that differs from that of the computer system 1301-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1306 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 14:
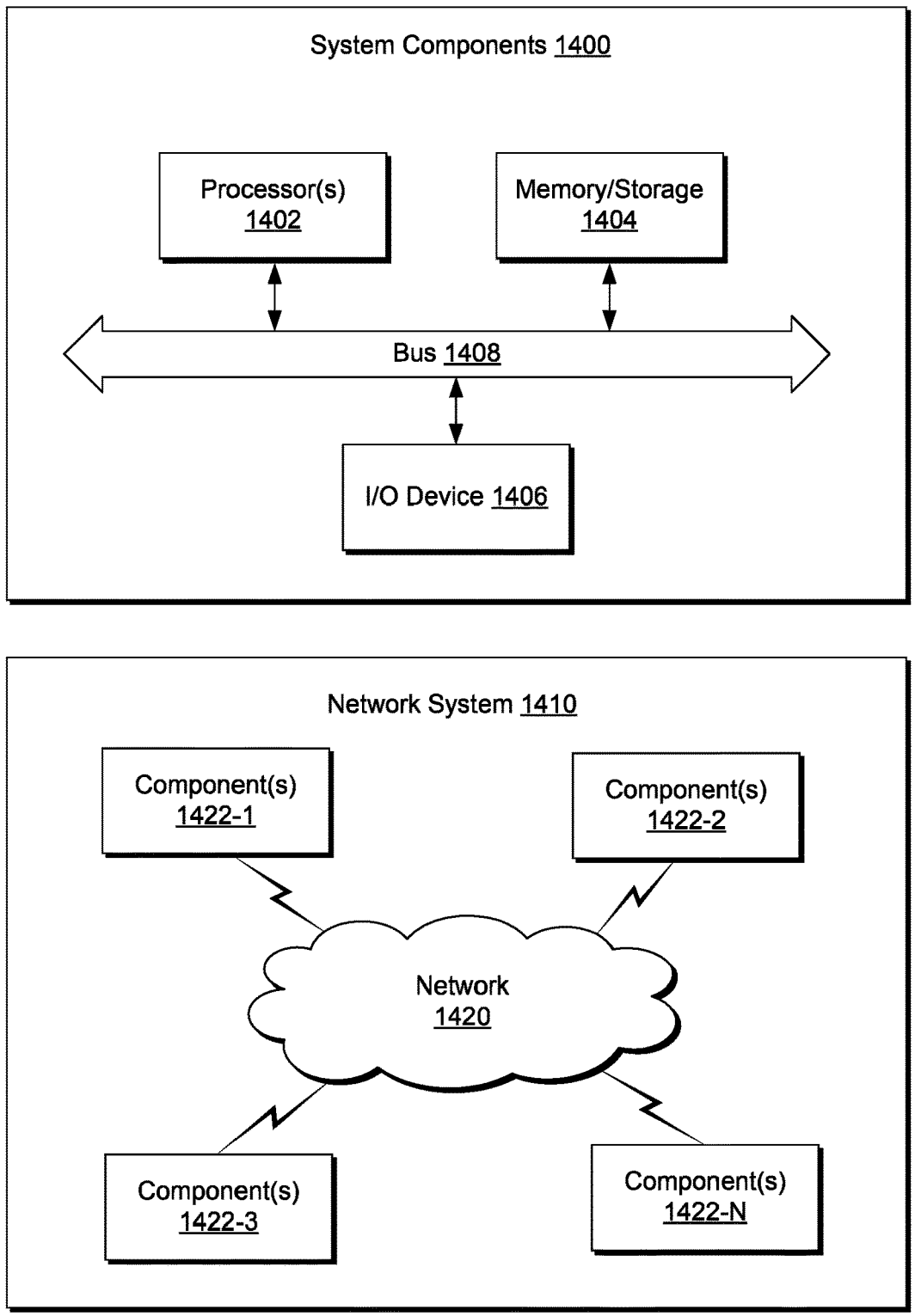
FIG. 14 illustrates example components of a system and a networked system.

FIG. 14 shows components of a computing system 1400 and a networked system 1410. The system 1400 includes one or more processors 1402, memory and/or storage components 1404, one or more input and/or output devices 1406 and a bus 1408. According to an embodiment, instructions may be stored in one or more computer-readable media (e.g., memory/storage components 1404). Such instructions may be read by one or more processors (e.g., the processor(s) 1402) via a communication bus (e.g., the bus 1408), which may be wired or wireless. The one or more processors may execute such instructions to implement (wholly or in part) one or more attributes (e.g., as part of a method). A user may view output from and interact with a process via an I/O device (e.g., the device 1406). According to an embodiment, a computer-readable medium may be a storage component such as a physical memory storage device, for example, a chip, a chip on a package, a memory card, etc.

According to an embodiment, components may be distributed, such as in the network system 1410. The network system 1410 includes components 1422-1, 1422-2, 1422-3, . . . 1422-N. For example, the components 1422-1 may include the processor(s) 1402 while the component(s) 1422-3 may include memory accessible by the processor(s) 1402. Further, the component(s) 1422-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
accessing data generated during field operations;
analyzing at least a portion of the data to automatically generate legal tag property values and to assess one or more existing legal tag property values by a comparison to one or more of the automatically generated legal tag property values;
based at least in part on the comparison, revising one or more of the existing legal tag property values to generate assessed legal tag property values;
storing the assessed legal tag property values in association with the data; and
operating a computational framework in accordance with the assessed legal tag property values.

2. The method of claim 1 comprising assessing one or more of the existing legal tag property values to identify a conflict and rendering an indicator to a display for the conflict.

3. The method of claim 1 comprising assessing one or more of the existing legal tag property values to identify a conflict and revising at least one of the existing legal tag property values to resolve the conflict.

4. The method of claim 1 wherein the data comprise ingested data as ingested by a data ingestion process that utilizes a specified legal tag schema.

5. The method of claim 1 wherein the data comprise well data.

6. The method of claim 1 wherein the analyzing comprises utilizing a plurality of different computational components, wherein one of the computational components searches for personally identifiable data and wherein another one of the computational components searches for geographically identifiable data.

7. The method of claim 1 wherein the analyzing comprises accessing a data catalog associated with the computational framework.

8. The method of claim 1 wherein the operating accesses the stored assessed legal tag property values and prohibits at least one action in accordance with one of the assessed legal tag property values.

9. The method of claim 8 wherein the at least one action comprises transmission of a portion of the data or a result based on at least a portion of the data to a destination in a prohibited country.

10. The method of claim 1 wherein the operating accesses the stored assessed legal tag property values and performs at least one action in accordance with one of the assessed legal tag property values.

11. The method of claim 10 wherein the at least one action comprises deleting at least a portion of the data in accordance with one of the assessed legal tag property values.

12. The method of claim 1 comprising, responsive to the analyzing, deleting personally identifiable data in the at least a portion of the data.

13. The method of claim 1 comprising rendering at least one result of the analyzing to a graphical user interface on a display.

14. The method of claim 13 comprising receiving a signal via the graphical user interface that confirms at least one of the at least one result and that causes the storing of a corresponding legal tag property value as an assessed legal tag property value.

15. The method of claim 13 comprising receiving a signal via the graphical user interface that generates one or more legal tag property values.

16. The method of claim 15 wherein the signal corresponds to selection of a country that permits or prohibits transmission of data by the computational framework to that country.

17. A system comprising:
a processor;
memory accessible to the processor;
processor-executable instructions stored in the memory and executable by the processor to instruct the system to:
access data generated during field operations;
analyze at least a portion of the data to automatically generate legal tag property values and to assess one or more existing legal tag property values by a comparison to one or more of the automatically generated legal tag property values;
based at least in part on the comparison, revise one or more of the existing legal tag property values to generate assessed legal tag property values
store the assessed legal tag property values in association with the data; and
operate a computational framework in accordance with the assessed legal tag property values.

18. One or more computer-readable storage media comprising computer-executable instructions executable to instruct a computing system to:
access data generated during field operations;
analyze at least a portion of the data to automatically generate legal tag property values and to assess one or more existing legal tag property values by a comparison to one or more of the automatically generated legal tag property values;
based at least in part on the comparison, revise one or more of the existing legal tag property values to generate assessed legal tag property values store the assessed legal tag property values in association with the data; and
operate a computational framework in accordance with the assessed legal tag property values.

19. The method of claim 1, wherein the assessed legal tag property values correspond to legal tags, wherein one or more of the legal tags comprises a two or more of the assessed legal tag property values.

20. The method of claim 1, comprising receiving an instruction via the computational framework that initiates an ingestion process for performing the accessing data generated during field operations and the analyzing at least a portion of the data.

\* \* \* \* \*